(12) United States Patent
Kim et al.

(10) Patent No.: US 12,244,163 B2
(45) Date of Patent: Mar. 4, 2025

(54) POWER SUPPLY SYSTEM FOR ELECTRIC VEHICLE

(71) Applicants: Hyundai Motor Company, Seoul (KR); Kia Corporation, Seoul (KR); Yura Corporation Co., Ltd., Seongnam-Si (KR)

(72) Inventors: Je Hyun Kim, Seoul (KR); Sang Wook Park, Hwaseong-Si (KR); Tae Won Lim, Yongin-Si (KR); Hyun Young Kim, Anyang-Si (KR)

(73) Assignees: Hyundai Motor Company, Seoul (KR); Kia Corporation, Seoul (KR); Yura Corporation Co., Ltd., Seongnam-Si (KR)

( * ) Notice: Subject to any disclaimer, the term of this patent is extended or adjusted under 35 U.S.C. 154(b) by 182 days.

(21) Appl. No.: 18/140,716

(22) Filed: Apr. 28, 2023

(65) Prior Publication Data
US 2024/0154433 A1 May 9, 2024

(30) Foreign Application Priority Data
Nov. 9, 2022 (KR) .................. 10-2022-0148583

(51) Int. Cl.
*H02J 7/00* (2006.01)
*B60L 3/00* (2019.01)
*B60L 53/22* (2019.01)
*B60L 58/18* (2019.01)
*H02J 7/34* (2006.01)

(52) U.S. Cl.
CPC ............ *H02J 7/0029* (2013.01); *B60L 3/003* (2013.01); *B60L 53/22* (2019.02); *B60L 58/18* (2019.02); *H02J 7/0013* (2013.01); *H02J 7/007182* (2020.01); *H02J 7/342* (2020.01); *B60L 2210/10* (2013.01)

(58) Field of Classification Search
CPC ......... H02J 7/0029; H02J 7/342; B60L 53/22; B60L 58/18; B60L 3/003; B60L 2210/10
See application file for complete search history.

(56) References Cited

U.S. PATENT DOCUMENTS

| | | | |
|---|---|---|---|
| 10,160,325 B2 * | 12/2018 | Lee ..................... | F02N 11/0866 |
| 2016/0144725 A1 * | 5/2016 | Nozawa ................ | B60L 15/007 |
| | | | 307/10.1 |
| 2017/0158058 A1 * | 6/2017 | Lee ..................... | H02J 7/00304 |
| 2019/0061653 A1 * | 2/2019 | Takahashi .............. | B60L 53/20 |
| 2022/0402362 A1 * | 12/2022 | Lee ......................... | H02M 3/00 |
| 2023/0339449 A1 * | 10/2023 | Ozeki .................... | B60R 16/02 |

* cited by examiner

Primary Examiner — Jared Fureman
Assistant Examiner — Duc M Pham
(74) Attorney, Agent, or Firm — Banner & Witcoff, Ltd.

(57) ABSTRACT

A power supply system for an electric vehicle for autonomous driving may be capable of stabilizing power supply to power electric parts and indoor parts even when short circuit occurs in one or more nodes by variously configuring an architecture circuit for power supply to the PE parts and the indoor parts using one or more switching elements and a short-circuit detector associated with the one or more nodes.

20 Claims, 14 Drawing Sheets

POWER SUPPLY SYSTEM FOR ELECTRIC VEHICLE

CROSS-REFERENCE TO RELATED APPLICATION

This application claims, under 35 U.S.C. § 119(a), the benefit of and priority to Korean Patent Application No. 10-2022-0148583 filed on Nov. 9, 2022, the entire contents of which are incorporated herein by reference.

BACKGROUND

(a) Technical Field

The present disclosure relates to a power supply system for an electric vehicle. More particularly, it relates to a power supply system for an electric vehicle for autonomous driving capable of stabilizing power supply to vehicle parts in response to short circuit in a wire connected to a low-voltage direct current (DC) converter.

(b) Discussion of the Background

A power supply device for an electric vehicle for autonomous driving may include a high-voltage battery, an inverter that converts a high DC voltage of the high-voltage battery into an alternative current (AC) voltage and supplies the voltage to a motor, which is a driving source for driving, a low-voltage DC-DC converter (LDC) for converting a high DC voltage of the high-voltage battery into a DC voltage in the form of low voltage and large current to supply the voltage to a 12 V electric load and to supply the voltage to a low-voltage battery, which is a type of 12 V auxiliary battery, so that the battery may be charged, etc.

The above information disclosed in this Background section is only for enhancement of understanding of the background of the disclosure and therefore it may contain information that does not form the prior art that is already known to a person of ordinary skill in the art.

SUMMARY OF THE DISCLOSURE

The present disclosure has been made in an effort to solve the problems described herein. An object of the present disclosure is to provide a power supply system for an electric vehicle for autonomous driving capable of stabilizing power supply to power electric (PE) parts and indoor parts even when short circuit occurs in wiring connected between an output terminal of an LDC and a junction block for PE parts and/or short circuit occurs in a charge/discharge line connected between an output terminal of an LDC and an auxiliary battery by variously configuring an architecture circuit for power supply to the PE parts and the indoor parts using a plurality of high-current switches, a DC-DC converter, etc.

A power supply system for an electric vehicle may comprise: a first low-voltage DC-DC converter (LDC) and a second LDC connected in parallel to a main battery; a first switch coupled to an output terminal of the first LDC via first wiring; a junction block for power electric (PE) parts and a junction block for indoor parts connected in series, wherein the junction block for PE parts is coupled to the first switch via a conductive line; a first auxiliary battery coupled to a first charge/discharge line branched from the conductive line; a second switch coupled to the first charge/discharge line; an auxiliary junction block coupled to an output terminal of the second LDC via second wiring; a second auxiliary battery coupled to a second charge/discharge line branched from the second wiring; a short-circuit detector configured to detect at least one of: a short circuit associated with the first wiring or a short circuit associated with the first charge/discharge line; and a controller, based on a detection signal of the short-circuit detector, configured to perform a control operation to selectively turn off the first switch or the second switch or perform a control operation to turn off both the first switch and the second switch.

Based on a short-circuit detection signal associated with the first wiring being received from the short-circuit detector, the controller may be configured to perform a control operation to turn off the first switch and perform a control operation to maintain the second switch in an ON state.

Based on the first switch being turned off, and the second switch being maintained in the ON state, power may be supplied to the junction block for PE parts and the junction block for indoor parts from the first auxiliary battery via the first charge/discharge line and the conductive line.

Based on a short-circuit detection signal associated with the first charge/discharge line being received from the short-circuit detector, the controller may be configured to perform a control operation to maintain the first switch in an ON state and to perform a control operation to turn off the second switch.

Based on the first switch is maintained in the ON state, and the second switch is turned off, power may be supplied to the junction block for PE parts and the junction block for indoor parts from the first LDC via the first wiring and the conductive line.

A power supply system for an electric vehicle may comprise: a low-voltage DC-DC converter (LDC) coupled to a main battery; a first switch coupled to an output terminal of the LDC via first wiring; a junction block for power electric (PE) parts and a junction block for indoor parts connected in series, wherein the junction block for PE parts is coupled to the first switch via a first conductive line; a first auxiliary battery coupled to a first charge/discharge line branched from the first conductive line; a second switch coupled to the first charge/discharge line; a connector line branched from the first charge/discharge line between the first conductive line and the second switch; an auxiliary node coupled to the connector line; an auxiliary junction block coupled to the auxiliary node via a second conductive line; a second auxiliary battery coupled to a second charge/discharge line branched from the second conductive line; a short-circuit detector configured to detect at least one of: a short circuit associated with the first wiring, a short circuit associated with the first charge/discharge line, a short circuit associated with the connector line, or a short circuit associated with the second charge/discharge line; and a controller, based on a detection signal of the short-circuit detector, configured to perform a control operation to selectively turn off the first switch, the second switch, or the auxiliary node.

Lead-acid batteries may be adopted as the first auxiliary battery and the second auxiliary battery when the auxiliary node comprises a DC-DC converter. Lithium-ion batteries may be adopted as the first auxiliary battery and the second auxiliary battery when the auxiliary node comprises a third switch.

Based on a short-circuit detection signal associated with the first wiring being received from the short-circuit detector, the controller may be configured to perform a control operation to turn off the first switch and perform a control operation to maintain the second switch in an ON state.

Based on the first switch being turned off, and the second switch being maintained in the ON state, power may be supplied to the junction block for PE parts and the junction block for indoor parts from the first auxiliary battery via the first charge/discharge line and the first conductive line.

Based on a short-circuit detection signal associated with the first wiring being received from the short-circuit detector, the controller may be configured to compare an output voltage of the first auxiliary battery and an output voltage of the second auxiliary battery, and to control the auxiliary node so that current is allowed to flow from the first auxiliary battery to the second auxiliary battery when the output voltage of the first auxiliary battery is larger than the output voltage of the second auxiliary battery by a reference value.

When the current is allowed to flow from the first auxiliary battery to the second auxiliary battery, power may be allowed to be supplied from the first auxiliary battery to the second auxiliary battery, and the second auxiliary battery is charged.

Based on a short-circuit detection signal associated with the first wiring being received from the short-circuit detector, the controller may be configured to compare an output voltage of the first auxiliary battery and an output voltage of the second auxiliary battery, and to control the auxiliary node so that current is allowed to flow from the second auxiliary battery to the first auxiliary battery when the output voltage of the second auxiliary battery is larger than the output voltage of the first auxiliary battery by a reference value.

When the current is allowed to flow from the second auxiliary battery to the first auxiliary battery, power may be allowed to be supplied from the second auxiliary battery to the first auxiliary battery, and the first auxiliary battery is charged.

Based on a short-circuit detection signal associated with the first charge/discharge line being received from the short-circuit detector, the controller may be configured to perform a control operation to maintain the first switch in an ON state and to perform a control operation to turn off the second switch.

Based on the first switch being maintained in the ON state, and the second switch being turned off, power may be supplied to the junction block for PE parts and the junction block for indoor parts from the LDC via the first wiring and the first conductive line.

Based on a short-circuit detection signal associated with the first wiring and a short-circuit detection signal associated with the first charge/discharge line being received from the short-circuit detector, the controller may be configured to control the auxiliary node so that a current is allowed to flow from the second auxiliary battery to the first auxiliary battery.

When the current is allowed to flow from the second auxiliary battery to the first auxiliary battery, power may be supplied to the junction block for PE parts and the junction block for indoor parts from the second auxiliary battery via the connector line and the first conductive line.

Based on a short-circuit detection signal associated with the second charge/discharge line being received from the short-circuit detector, the controller may be configured to maintain the first switch and the second switch in ON states, and control a DC-DC converter so that a current flow is allowed to be blocked or perform a control operation to turn off a third switch to supply power to the junction block for PE parts and the junction block for indoor parts. The auxiliary node may comprise at least one of: the DC-DC converter or the third switch.

Based on a short-circuit detection signal associated with the connector line being received from the short-circuit detector, the controller may be configured to perform a control operation to turn off the first switch and the second switch, and control a DC-DC converter of the auxiliary node so that a current flow is allowed to be blocked or perform a control operation to turn off a third switch of the auxiliary node.

Power may be supplied from the second auxiliary battery to the auxiliary junction block via the second conductive line based on: a control operation being performed to turn off the first switch and the second switch; and a DC-DC converter of the auxiliary node being controlled so that a current flow is allowed to be blocked or a control operation being performed to turn off a third switch of the auxiliary node.

BRIEF DESCRIPTION OF THE DRAWINGS

The above and other features of the present disclosure will now be described in detail with reference to certain examples illustrated in the accompanying drawings which are given hereinbelow by way of illustration only, and thus do not limit the scope of the present disclosure, and wherein.

Figure 1:
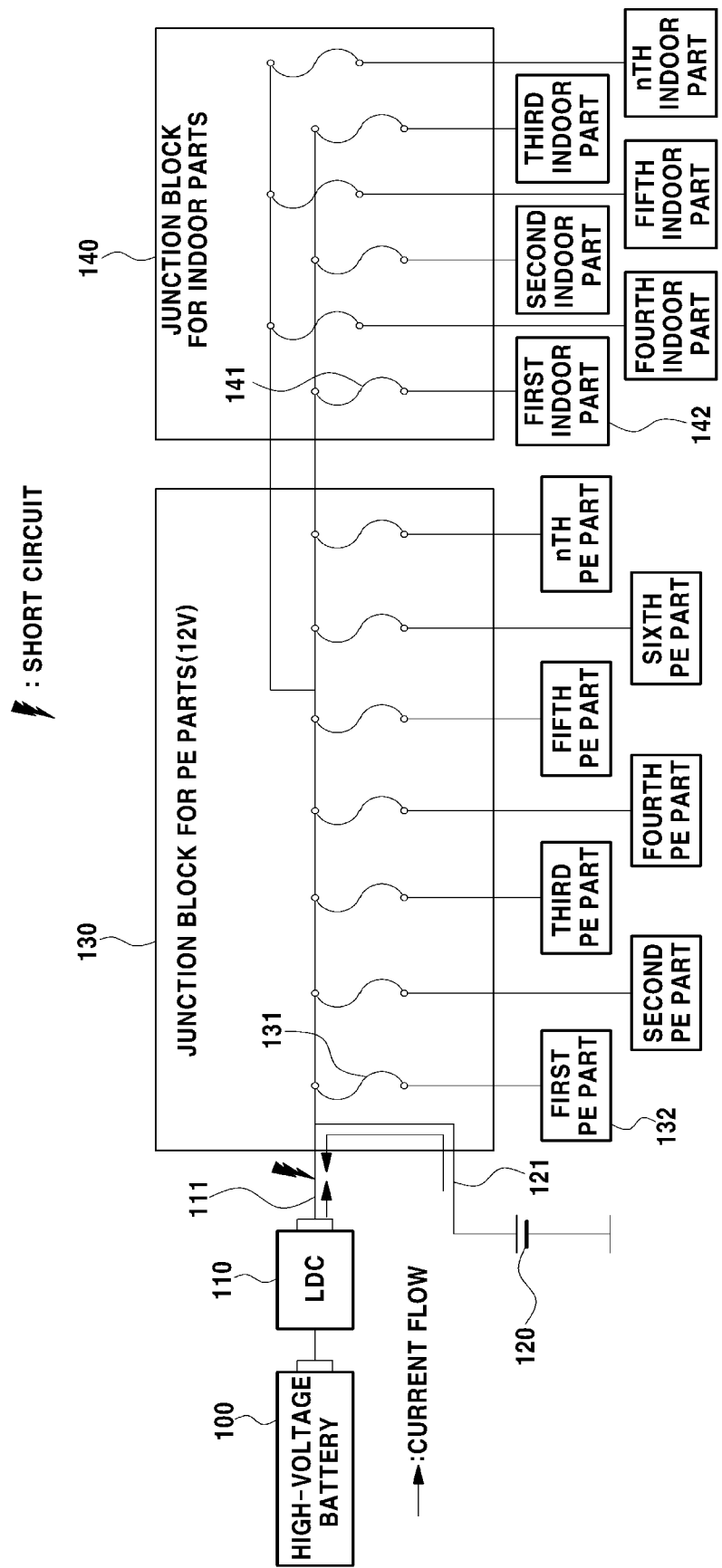
FIGS. 1 and 2 are circuit configuration diagrams illustrating examples of a related power supply system for an electric vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various examples of the present disclosure, examples of which are illustrated in the accompanying drawings and described below. While the disclosure will be described in conjunction with various examples, it will be understood that the present description is not intended to limit the scope of the disclosure to the illustrated examples. On the contrary, the disclosure is intended to cover not only the illustrated examples, but also various alternatives, modifications, equivalents and other implementations, which may be included within the scope of the disclosure as defined by the appended claims.

Here, an example of a related power supply system for an electric vehicle will be described as follows.

FIG. 1 is a configuration diagram illustrating an example of the related power supply system for the electric vehicle.

As illustrated in FIG. 1, a converter (e.g., a low-voltage DC-DC converter (LDC) 110 that converts a high DC voltage into a DC voltage in the form of low voltage and large current) may be connected to a high-voltage supply line of a battery (e.g., a high-voltage battery 100).

A junction block 130 for power electric (PE) parts and a junction block 140 for indoor parts may be sequentially connected to an output terminal of the LDC 110 by first wiring 111.

A first auxiliary battery 120, which may be a type of 12 V auxiliary battery, may be connected to the output terminal of the LDC 110 by a first charge/discharge line 121 branched from the first wiring 111.

A first fuse 131 connected to each of various controllers (such as a vehicle control unit (VCU), an integrated electric brake (IEB), advanced driver assistance systems (ADAS), etc. that may be used for autonomous driving control) and a plurality of PE parts 132 may be embedded in the junction block 130 for PE parts, and a second fuse 141 connected to each of a plurality of indoor parts 142 (such as clusters, lamps, door locks, etc.) may be embedded in the junction block 140 for indoor parts.

If a high DC voltage of the high-voltage battery 100 is converted into a DC voltage (for example, 12 V) in the form of low voltage and large current by the LDC 110, and supplied to the junction block 130 for PE parts and the junction block 140 for indoor parts through the first wiring 111, a DC voltage may be distributed and supplied to each of the PE parts 132 through the first fuse 131, and a DC voltage may be distributed and supplied to each of the indoor parts 142 through the second fuse 141.

If the high DC voltage of the high-voltage battery 100 is converted into a DC voltage (for example, 12 V) in the form of low voltage and large current by the LDC 110, and supplied to the first auxiliary battery 120 through the first wiring 111 and the first charge/discharge line 121, the first auxiliary battery 120 may be charged.

If a short circuit occurs in the first wiring 111 connected to the output terminal of the LDC 110, the DC voltage in the form of low voltage and large current cannot be supplied to the junction block 130 for PE parts and the junction block 140 for indoor parts, which may incur a problem in that the various controllers, which are PE parts, may be reset or the first fuse 131 may be short-circuited. In such a case, there is a problem in that the vehicle cannot be driven.

If a short circuit occurs in the first wiring 111 connected to the output terminal of the LDC 110, a discharge current of the first auxiliary battery 120 may not flow to the junction block 130 for PE parts and the junction block 140 for indoor parts, and leak to a short-circuit part of the first wiring 111 along a current flow direction indicated by an arrow of FIG. 1. Accordingly, there may be a problem in that power of the first auxiliary battery 120 cannot be utilized for the PE parts and the indoor parts.

Another example of a related power supply system for the electric vehicle is described as follows.

Figure 2:
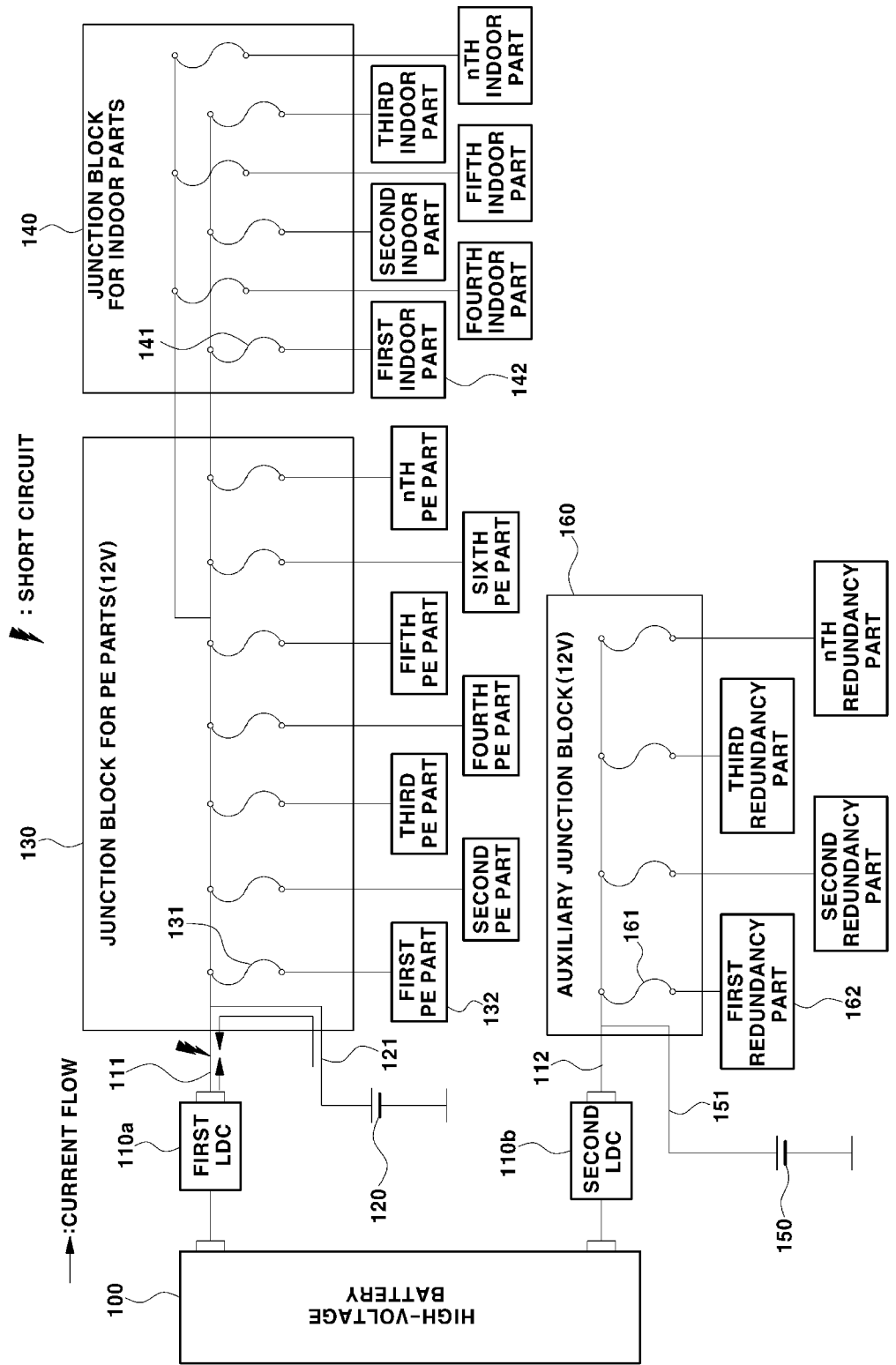

FIG. 2 is a configuration diagram illustrating another example of the related power supply system for the electric vehicle. Some elements shown in FIG. 2 are the same or similar to those described with respect to FIG. 1, and the features of those elements described above may be applicable for the same (or similar elements) shown in FIG. 2.

As illustrated in FIG. 2, a first converter (e.g., a first LDC 110a similar to the LDC 110 shown in FIG. 1) and a second converter (e.g., a second LDC 110b) each for converting a high DC voltage into a DC voltage in the form of low voltage and large current may be connected in parallel to a high-voltage supply line of the high-voltage battery 100.

The junction block 130 for PE parts and the junction block 140 for indoor parts may be sequentially connected to an output terminal of the LDC 110a by first wiring 111.

The first auxiliary battery 120, which may be a type of 12 V auxiliary battery, may be connected to the output terminal of the first LDC 110a by the first charge/discharge line 121 branched from the first wiring 111.

An auxiliary junction block 160 may be connected to an output terminal of the second LDC 110b by second wiring 112, and a second auxiliary battery 150, which may be a type of 12 V auxiliary battery, may be connected to the output terminal by a second charge/discharge line 151 branched from the second wiring 112.

A third fuse 161 connected to each of redundancy parts 162 (for example, steering controller, etc.) that may be used for emergency driving or inertia driving during autonomous driving may be embedded in the auxiliary junction block 160.

If a high DC voltage of the high-voltage battery 100 is converted into a DC voltage (for example, 12 V) in the form of low voltage and large current by the first LDC 110a, and supplied to the junction block 130 for PE parts and the junction block 140 for indoor parts through the first wiring 111, a DC voltage may be distributed and supplied to each of the PE parts 132 through the first fuse 131, and a DC voltage may be distributed and supplied to each of the indoor parts 142 through the second fuse 141.

If the high DC voltage of the high-voltage battery 100 is converted into a DC voltage (for example, 12 V) in the form of low voltage and large current by the first LDC 110a, and supplied to the first auxiliary battery 120 through the first wiring 111 and the first charge/discharge line 121, the first auxiliary battery 120 may be charged.

If a short circuit occurs in the first wiring 111 connected to the output terminal of the first LDC 110a, the DC voltage in the form of low voltage and large current cannot be supplied to the junction block 130 for PE parts and the junction block 140 for indoor parts, which may incur a problem in that the various controllers, which are PE parts, may be reset or the first fuse 131 may be short-circuited.

If a short circuit occurs in the first wiring 111 connected to the output terminal of the first LDC 110a, a discharge current of the first auxiliary battery 120 may not flow to the junction block 130 for PE parts and the junction block 140 for indoor parts, and leak to a short-circuit part of the first wiring 111 along a current flow direction indicated by an arrow of FIG. 2. Accordingly, there may be a problem in that power of the first auxiliary battery 120 cannot be utilized for the PE parts and the indoor parts.

If the high DC voltage of the high-voltage battery 100 is converted into a DC voltage in the form of low voltage and large current by the second LDC 110b, and supplied to the auxiliary junction block 160 through the second wiring 112, the DC voltage may be distributed and supplied to each of the redundancy parts 162 through the second fuse 161, so that inertia driving capable of evacuating the vehicle to a safe place (for example, a shoulder) may be performed by an operation of each of the redundancy parts 162.

One or more elements described herein may be replaced with other elements. For example, one or more fuses (e.g., the fuses 131, 141, 161) may be replaced with one or more electric connectors that may or may not have a fuse.

Hereinafter, examples will be described in detail with reference to the accompanying drawings.

First, a configuration of a power supply system for an electric vehicle will be described.

Figure 3:
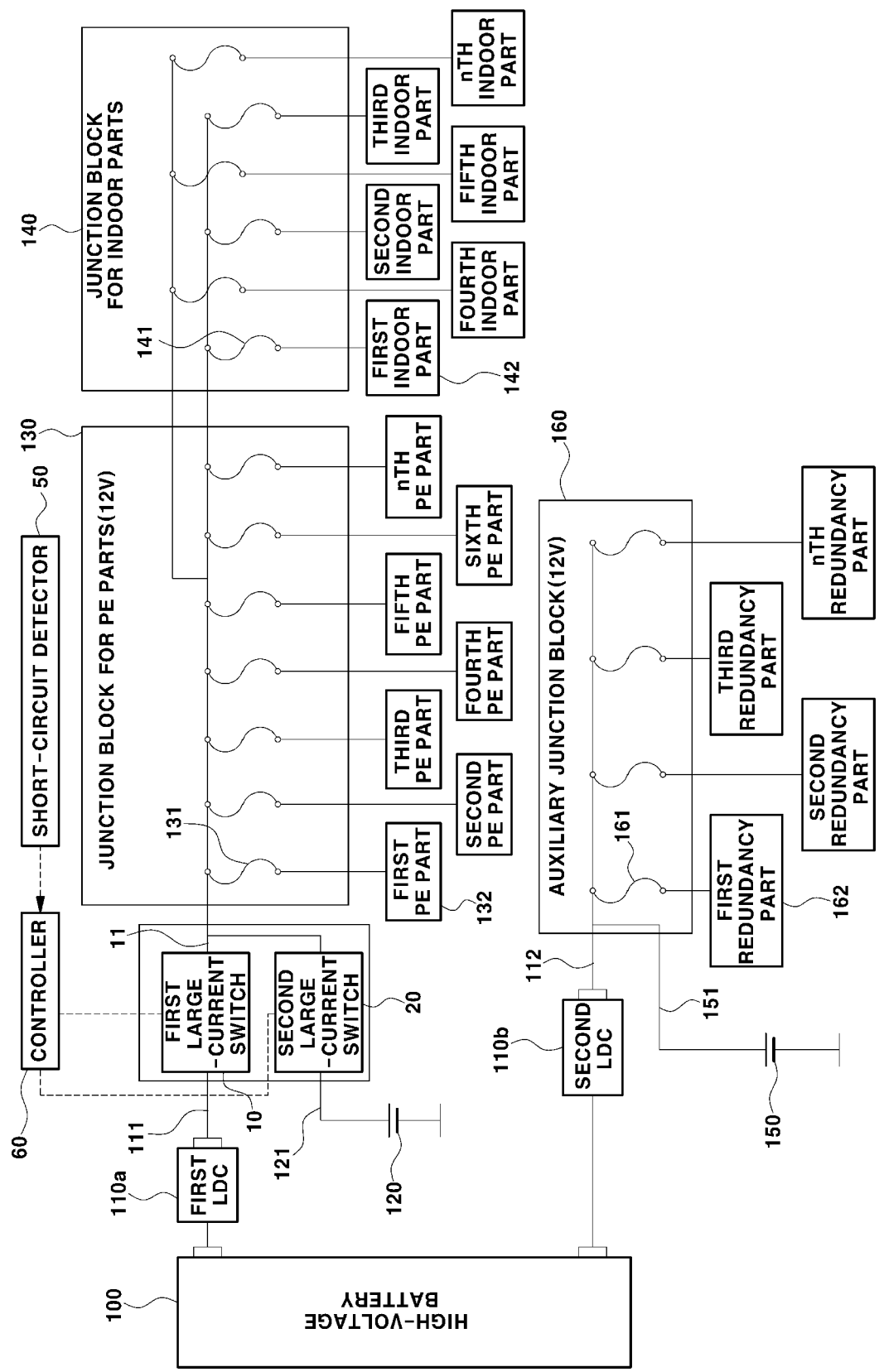
FIG. 3 is a circuit configuration diagram illustrating a power supply system for an electric vehicle.

FIG. 3 is a circuit configuration diagram illustrating the power supply system for the electric vehicle.

As illustrated in FIG. 3, a plurality of converters (e.g., a first LDC 110*a* and a second LDC 110*b* each for converting a high DC voltage into a DC voltage in the form of low voltage and large current) may be connected in parallel to a supply lie of a power source (e.g., a high-voltage supply line of a high-voltage battery 100).

For example, a first switch (e.g., a first large-current switch 10) may be mounted at a rear end of first wiring 111 connected to an output terminal of a first converter (e.g., the first LDC 110*a*).

A plurality of junction blocks (e.g., a junction block 130 for PE parts and a junction block 140 for indoor parts) may be sequentially connected in series to a rear end of the first switch (e.g., the first large-current switch 10) by a conductive line 11.

A first connector (e.g., a first fuse 131) connected to each of various controllers for autonomous driving control and a plurality of PE parts 132 may be embedded in a first junction block (e.g., the junction block 130 for PE parts), and a second connector (e.g., a second fuse 141) connected to each of a plurality of indoor parts 142 (such as clusters, lamps, door locks, etc.) may be embedded in a second junction block (e.g., the junction block 140 for indoor parts).

A second power source (e.g., a first auxiliary battery 120) may be connected to a first charge/discharge line 121 branched from the conductive line 11.

In an example, the first auxiliary battery 120, which may be a type of 12 V auxiliary battery, may be connected to the output terminal of the first LDC 110*a* by the first charge/discharge line 121 branched from the conductive line 11.

A second switch (e.g., a second large-current switch 20) may be mounted on the first charge/discharge line 121.

A third junction block (e.g., an auxiliary junction block 160) may be connected to an output terminal of a second converter (e.g., the second LDC 110*b*) by second wiring 112, and a third power source (e.g., a second auxiliary battery 150, which may be a type of 12 V auxiliary battery) may be connected the output terminal by a second charge/discharge line 151 branched from the second wiring 112.

A third connector (e.g., a third fuse 161) connected to each of redundancy parts 162 (for example, steering controller, etc.) for emergency driving or inertia driving during autonomous driving may be embedded in the auxiliary junction block 160.

The power supply system may include a short-circuit detector 50 for detecting a short circuit of the first wiring 111 and/or the first charge/discharge line 121, and a controller 60 for performing a control operation to selectively turn off the first large-current switch 10 or the second large-current switch 20, or turn off both the first large-current switch 10 and the second large-current switch 20, for example, based on a detection signal of the short-circuit detector 50.

The short-circuit detector 50 may comprise a first voltage sensor for monitoring a voltage across a node at the first wiring 111 and a reference node (e.g., a neutral node, a ground node, etc.) and/or a second voltage sensor for monitoring a voltage across a node at the first charge/discharge line 121 and a reference node (e.g., the neutral node, the ground node, or other nodes, etc.). The-circuit detector 50 may comprise a first current sensor for monitoring a current flowing through the first wiring 111 and/or a second current sensor for monitoring a current flowing through the first charge/discharge line 121.

Here, various operation flows for the power supply system for the electric vehicle will be described with reference to FIGS. 4 to 6.

The short-circuit detector 50 may monitor and detect the voltages and/or the currents associated with the first wiring 111 or the first charge/discharge line 121, and may transmit a detection signal to a controller 60.

Based on the detection signal transmitted from the short-circuit detector 50, when the voltage are within a reference voltage range and/or the currents are within a reference current range, the controller 60 may determine that the first wiring 111 and/or the first charge/discharge line 121 is/are not short-circuited and are normal, and may perform a control operation to maintain the first large-current switch 10 and/or the second large-current switch 20 in an ON state.

Figure 4:
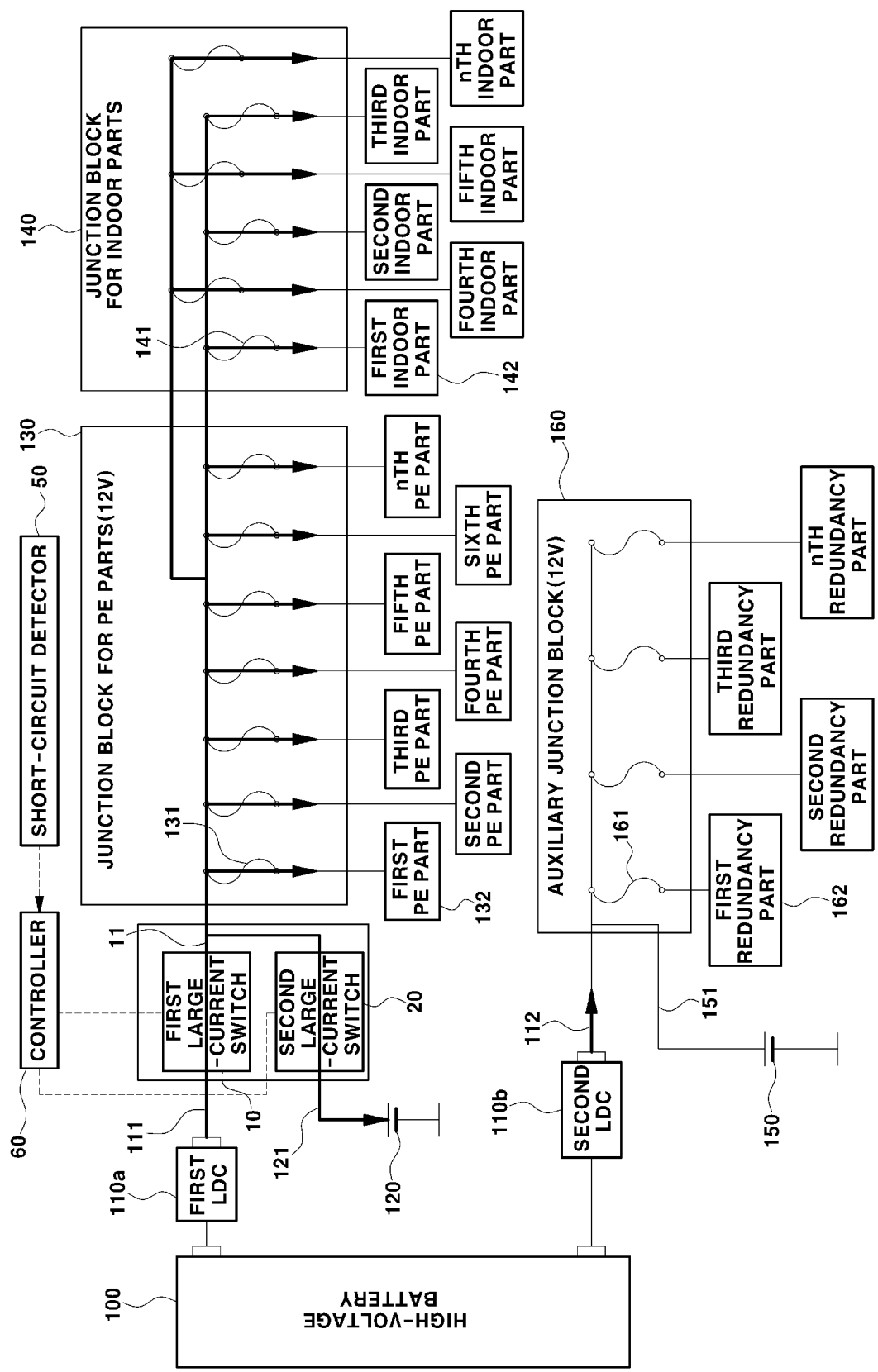
FIGS. 4, 5, and 6 are circuit configuration diagrams illustrating operation examples of the power supply system for the electric vehicle.

If a high DC voltage of the high-voltage battery 100 is converted into a DC voltage (for example 12 V) in the form of low voltage and large current by the first LDC 110*a*, and the converted DC voltage causes a DC current that sequentially passes through the first wiring 111, the first large-current switch 10, and the conductive line 11 and is supplied to the junction block 130 for PE parts and the junction block 140 for indoor parts as illustrated in FIG. 4, the DC voltage may be distributed and supplied to each of the PE parts 132 through the first fuse 131, and the DC voltage may be distributed and supplied to each of the indoor parts 142 through the second fuse 141.

If a high DC voltage of the high-voltage battery 100 is converted into a DC voltage (for example 12 V) in the form of low voltage and large current by the first LDC 110*a*, and the converted DC voltage causes a DC current that sequentially passes through the first wiring 111, the first large-current switch 10, the conductive line 11, and the first charge/discharge line 121, on which the second large-current switch 20 is mounted, and is supplied to the first auxiliary battery 120 as illustrated in FIG. 4, the first auxiliary battery 120 may be charged.

The controller 60 may be configured to perform a control operation to turn off the first large-current switch 10 and perform a control operation to turn on the second large-current switch 20 upon receiving a short-circuit detection signal indicating a short-circuit detection associated with the first wiring 111 from the short-circuit detector 50.

Figure 5:
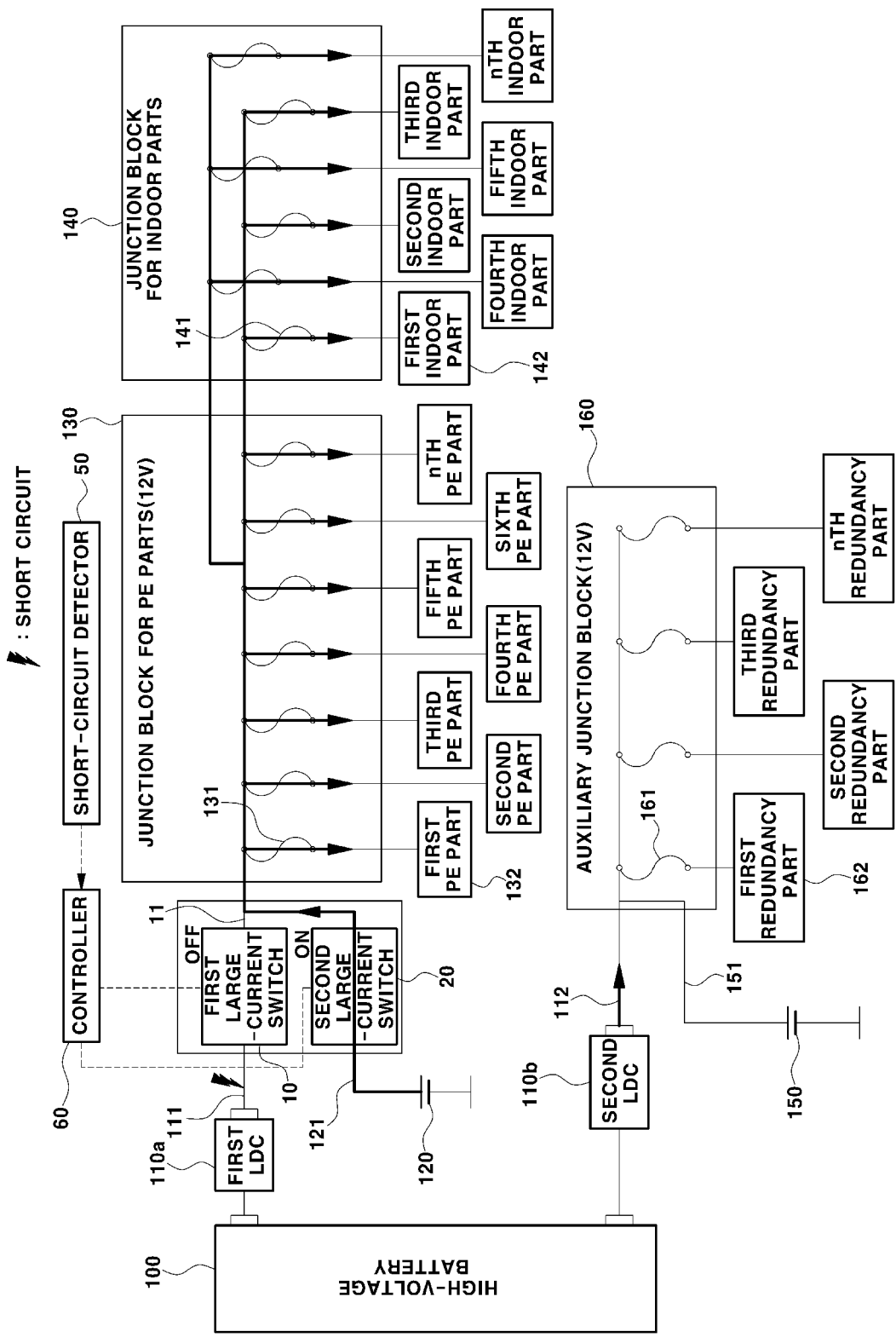

For example, based on a detection signal (e.g., the short-circuit detection signal indicating a short-circuit detection associated with the first wiring 111) transmitted from the short-circuit detector 50, when a voltage across the first wiring 111 and the reference node is does not satisfy the reference voltage range (e.g., less than the reference voltage range) and/or a current flowing through the first wiring 111 does not satisfy the reference current range (e.g., less than the reference current range), the controller 60 may determine that the first wiring 111 is short-circuited and perform a control operation to turn off the first large-current switch 10 and a control operation to maintain the second large-current switch 20 in an ON state (e.g., the second large-current switch 20 is turned on and electrically connects the two nodes coupled to the second large-current switch 20) as illustrated in FIG. 5.

Accordingly, even when the first wiring 111 is short-circuited, as illustrated in FIG. 5, if the first large-current switch 10 is turned off, and the second large-current switch 20 may be maintained in the ON state, power may be supplied from the first auxiliary battery 120 to the junction block 130 for PE parts and the junction block 140 for indoor parts through the first charge/discharge line 121 and the conductive line 11, a DC voltage may be distributed and supplied to each of the PE parts 132 through the first fuse 131, and a DC voltage may be distributed and supplied to each of the indoor parts 142 through the second fuse 141.

The controller 60 may be configured to perform a control operation to maintain the first large-current switch 10 in an ON state and perform a control operation to turn off the second large-current switch 20 upon receiving a short-circuit detection signal indicating a short-circuit detection associated with the first charge/discharge line 121 connected between the second large-current switch 20 and the first auxiliary battery 120 from the short-circuit detector 50.

Figure 6:
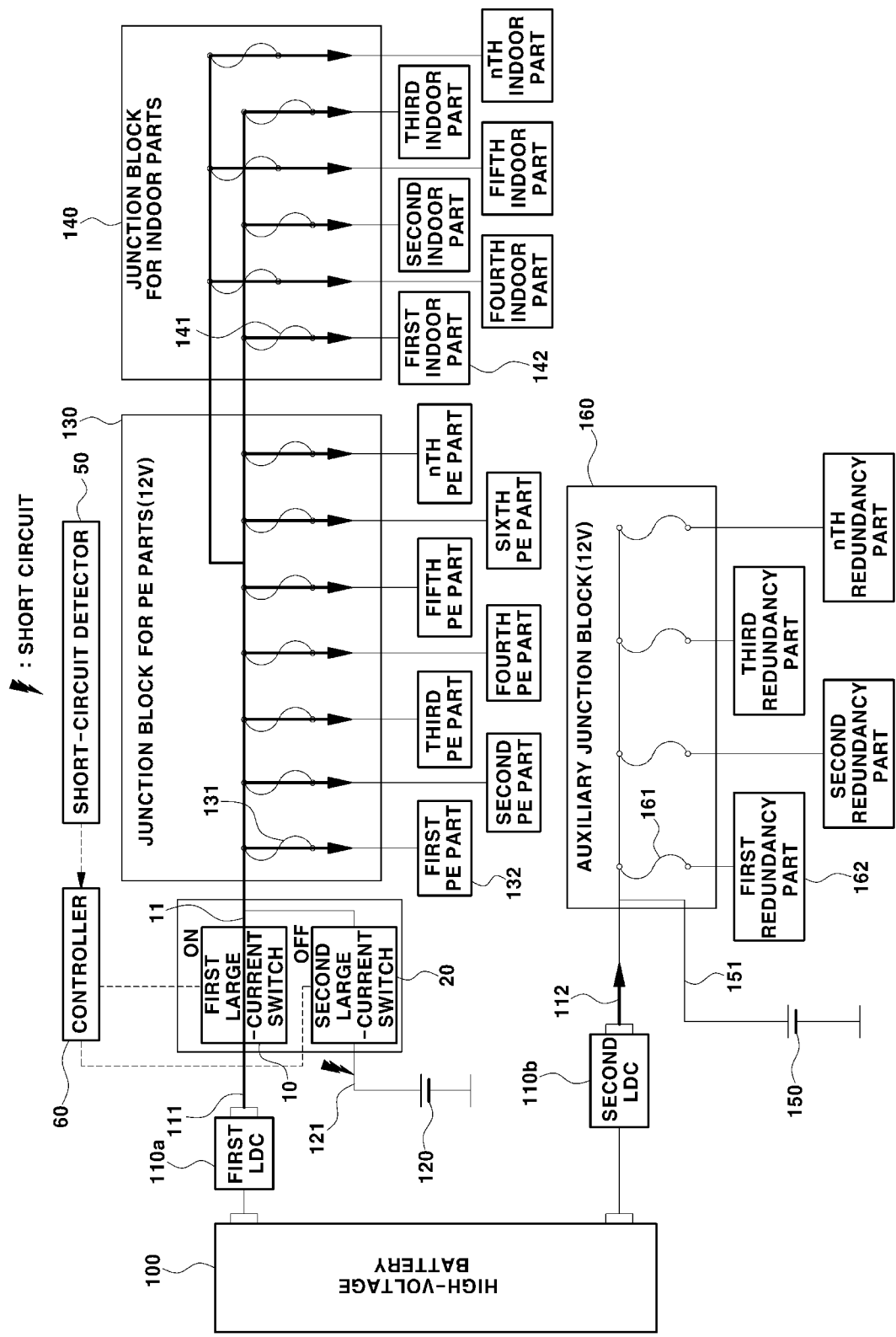

For example, based on the detection signal (e.g., the short-circuit detection signal indicating a short-circuit detection associated with the first charge/discharge line 121) transmitted from the short-circuit detector 50, when a voltage across the first charge/discharge line 121 and the reference node does not satisfy the reference voltage range (e.g., less than the reference voltage range) and/or a current flowing through the first charge/discharge line 121 does not satisfy the reference current range (e.g., less than the reference current range), the controller 60 may determine that the first charge/discharge line 121 is short-circuited, and perform a control operation to maintain the first large-current switch 10 in an ON state and a control operation to turn off the second large-current switch 20 as illustrated in FIG. 6.

Accordingly, even when the first charge/discharge line 121 is short-circuited, as illustrated in FIG. 6, if the first large-current switch 10 is maintained in the ON state, and the second large-current switch 20 is turned off, power may be supplied from the first LDC 110 to the junction block 130 for PE parts and the junction block 140 for indoor parts through the first wiring 111 and the conductive line 11, a DC voltage may be distributed and supplied to each of the PE parts 132 through the first fuse 131, and a DC voltage may be distributed and supplied to each of the indoor parts 142 through the second fuse 141.

If both the first wiring 111 and the first charge/discharge line 121 are short-circuited, both the first large-current switch 10 and the second large-current switch 20 may be turned off under the control of the controller 60, and redundant power, which may be a type of backup power, may be supplied from the second LDC 110b to the auxiliary junction block 160.

For example, if both the first wiring 111 and the first charge/discharge line 121 are short-circuited, a high DC voltage of the high-voltage battery 100 may be converted into a DC voltage in the form of low voltage and large current by the second LDC 110b, and supplied to the auxiliary junction block 160 through the second wiring 112 in a state in which both the first large-current switch 10 and the second large-current switch 20 are turned off, so that a DC voltage may be distributed and supplied to each of the redundancy parts 162 through the second fuse 161. In this way, inertia driving for emergency evacuation of the vehicle to a safe place (for example, a shoulder) may be performed by an operation of each of the redundancy parts 162.

An example configuration of a power supply system for the electric vehicle will be described as follows. The example configuration described below may be applied to the example configuration(s) described above. For example, the DC-DC converter 40 shown in FIG. 7 may be connected to the conductive line 11 of FIGS. 3-6.

Figure 7:
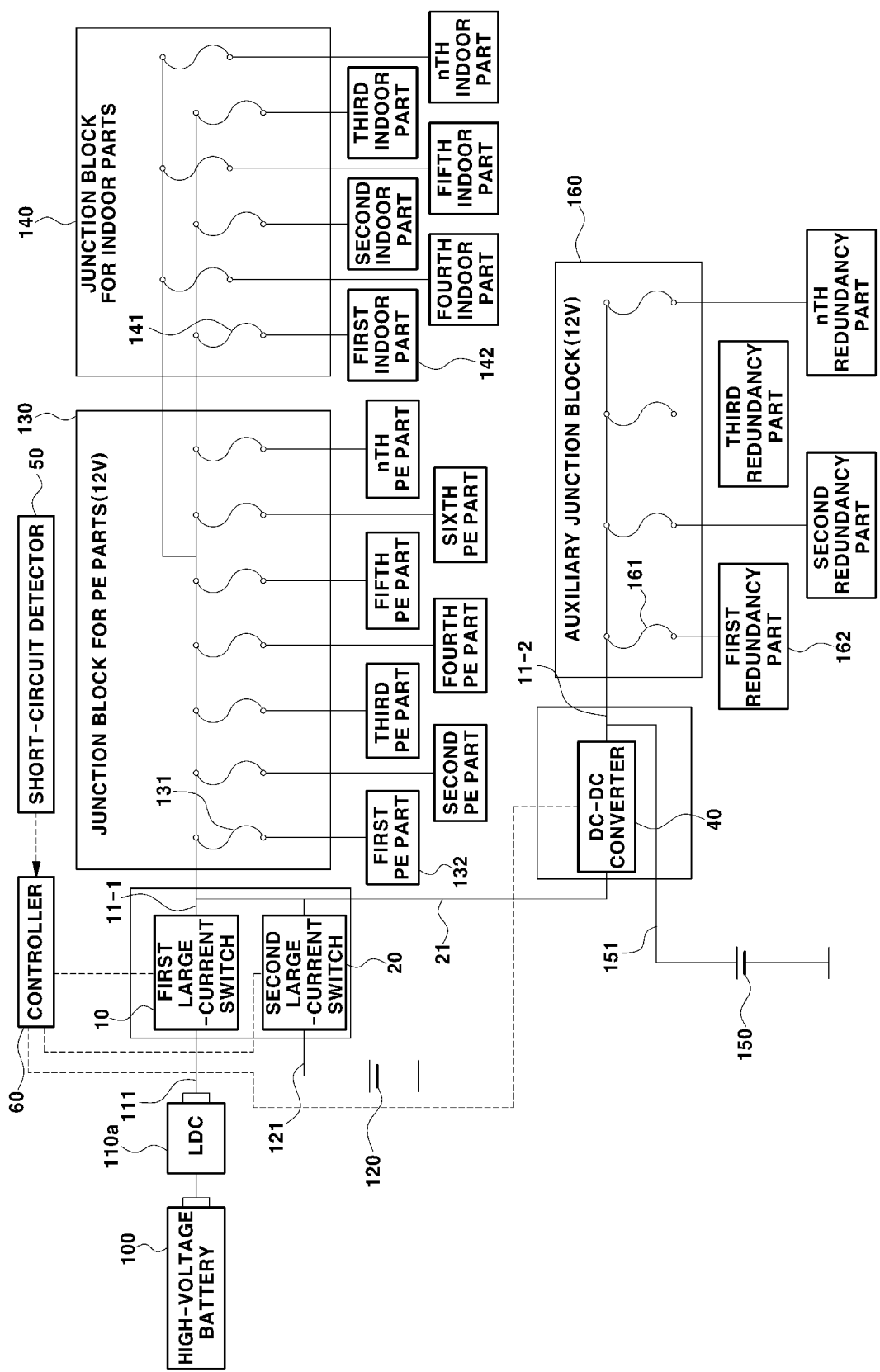
FIG. 7 is a circuit configuration diagram illustrating a power supply system for the electric vehicle.
Figure 14:
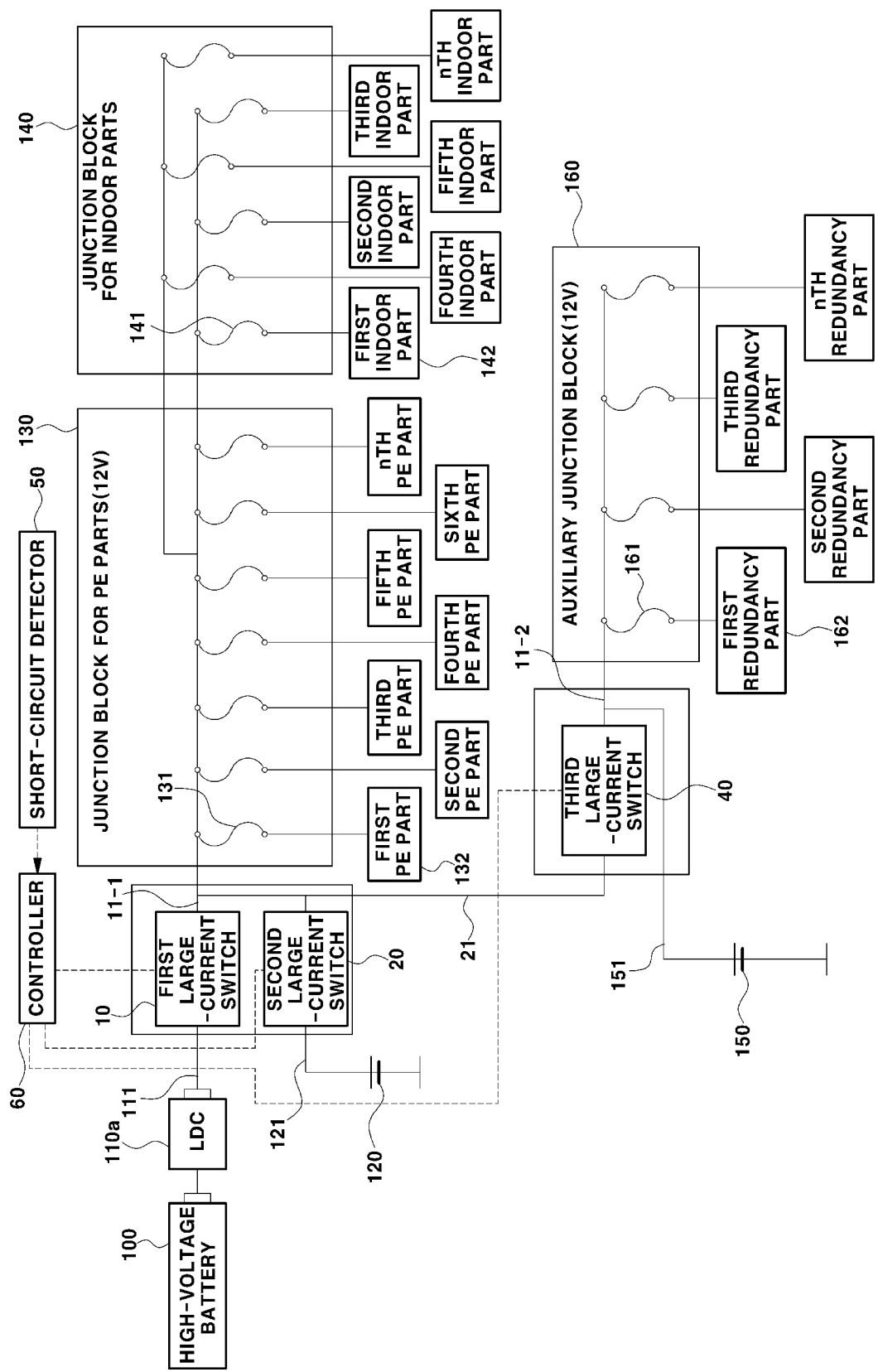
FIG. 14 is a circuit configuration diagram illustrating a power supply system for the electric vehicle.

FIGS. 7 and 14 are circuit configuration diagrams illustrating power supply systems for the electric vehicle.

As illustrated in FIGS. 7 and 14, a converter (e.g., an LDC 110 for converting a high DC voltage into a DC voltage in the form of low voltage and large current) may be connected to a supply line of a power source (e.g., a high-voltage supply line of a high-voltage battery 100).

For example, a first switch (e.g., a first large-current switch 10) may be mounted at a rear end of first wiring 111 connected to an output terminal of the converter (e.g., the LDC 110).

A first junction block (e.g., a junction block 130 for PE parts) and a second junction block (e.g., a junction block 140 for indoor parts) may be sequentially connected in series to a rear end of the first switch (e.g., the first large-current switch 10) by a first conductive line 11-1.

A first connector (e.g., a first fuse 131 connected to each of various controllers required for autonomous driving control and a plurality of PE parts 132) may be embedded in the junction block 130 for PE parts, and a second connector (e.g., a second fuse 141 connected to each of a plurality of indoor parts 142 such as clusters, lamps, door locks, etc.) may be embedded in the junction block 140 for indoor parts.

A second power source (e.g., a first auxiliary battery 120) may be connected to a first charge/discharge line 121 branched from the first conductive line 11-1.

For example, the first auxiliary battery 120, which may be a type of 12 V auxiliary battery, may be connected to the output terminal of the LDC 110 by the first charge/discharge line 121 branched from the first conductive line 11-1.

A second switch (e.g., a second large-current switch 20) may be mounted on the first charge/discharge line 121.

A conductive connector line 21 may be branched from the first charge/discharge line 121 between the first conductive line 11-1 and the second large-current switch 20. Thus, a DC-DC converter 40 may be mounted at a distal end of the connector line 21 as illustrated in FIG. 7, or a third switch (e.g., a second large-current switch 30) may be mounted at the distal end of the connector line 21 as illustrated in FIG. 14.

A third junction box (e.g., an auxiliary junction block 160) may be connected to the DC-DC converter 40 or the third large-current switch 30 by a second conductive line 11-2.

A second charge/discharge line 151 may be branched from the second conductive line 11-2, and a third power source (e.g., a second auxiliary battery 150) may be connected to the second charge/discharge line 151.

A power supply system may include a short-circuit detector 50 for detecting a short circuit associated with the first wiring 111, a short circuit associated with the first charge/discharge line 121, a short circuit associated with the connector line 21, and/or a short circuit associated with the second charge/discharge line 151. A controller 60 for performing a control operation to selectively turn off at least one of: the first large-current switch 10, the second large-current switch 20, the DC-DC converter 40, and/or the third large-current switch 30, for example, based on a detection signal of the short-circuit detector 50.

The short-circuit detector 50 may comprise a voltage sensor for monitoring a voltage applied to the first wiring 111, a voltage sensor for monitoring a voltage applied to the first charge/discharge line 121, a voltage sensor for monitoring a voltage applied to the connector line 21, and/or a voltage sensor for monitoring a voltage applied to the second charge/discharge line 151. The short-circuit detector 50 may comprise a current sensor for monitoring a current flowing through the first wiring 111, a current sensor for monitoring a current flowing through the first charge/discharge line 121, a current sensor for monitoring a current flowing through the connector line 21, and/or a current sensor for monitoring a current flowing through the second charge/discharge line 151.

The controller 60 may determine whether the DC-DC converter 40 or the third large-current switch 30 is mounted at the distal end of the connector line 21 using information stored in the controller 60 in advance, and may be configured to perform a control operation to turn off the DC-DC converter 40 so that a current flow may be blocked or a current flow is allowed in a forward direction or a reverse direction upon determining that the DC-DC converter 40 is mounted as a result of the above determination. The controller 60 may perform a control operation to enable or disable the DC-DC converter 40 upon determining that the DC-DC converter 40 is mounted or perform a control operation to turn on or turn off the third large-current switch 30 upon determining that the third large-current switch 30 is mounted.

If the DC-DC converter 40 is mounted at the distal end of the connector line 21, the controller 60 may control the DC-DC converter 40 so that current is allowed to flow in the forward direction or the reverse direction. Accordingly, charging from the first auxiliary battery 120 to the second auxiliary battery 150 may be performed, or charging from the second auxiliary battery 150 to the first auxiliary battery 120 may be performed. Therefore, low-cost lead-acid batteries may be applied to both the first auxiliary battery 120 and the second auxiliary battery 150 in place of expensive lithium-ion batteries in order to reduce costs.

If the third large-current switch 30 is mounted at the distal end of the connector line 21, lithium-ion batteries may be adopted as the first auxiliary battery 120 and the second auxiliary battery 150 since lithium-ion battery products include DC-DC converters that are controlled so that current is allowed to flow in the forward direction and the reverse direction.

Hereinafter, various operation flows of the power supply system of the electric vehicle will be described with reference to FIGS. 8 to 13.

The short-circuit detector 50 may monitor and detect a voltage applied to the first wiring 111 and/or a current flowing through the first wiring 111, and transmit a detection signal to the controller 60. The short-circuit detector 50 may monitor and detect a voltage applied to the first charge/discharge line 121 and/or a current flowing through charge/discharge line 121 and transmit a detection signal to the controller 60. The short-circuit detector 50 may monitor and detect a voltage applied to the connector line 21 and/or a current flowing through the connector line 21 and transmit a detection signal to the controller 60. The short-circuit detector 50 may monitor and detect a voltage applied to the second charge/discharge line 151 and/or a current flowing through the second charge/discharge line 151, and transmit a detection signal to the controller 60.

Based on the detection signal(s) transmitted from the short-circuit detector 50, when the voltage(s) applied to the first wiring 111, the first charge/discharge line 121, the connector line 21, and the second charge/discharge line 151 is/are within a reference voltage range and/or the current(s) flowing through the first wiring 111, the first charge/discharge line 121, the connector line 21, and the second charge/discharge line 151 is/are within a reference current range, the controller 60 may respectively determine that the first wiring 111, the first charge/discharge line 121, the connector line 21, and the second charge/discharge line 151 are not short-circuited and are normal, and perform a control operation to maintain the first large-current switch 10 and the second large-current switch 20 in an ON state.

Upon determining that the first wiring 111, the first charge/discharge line 121, the connector line 21, and the second charge/discharge line 151 are not short-circuited and are normal, the controller 60 may control the DC-DC converter 40 so that current is allowed to flow in the forward direction when the DC-DC converter 40 is mounted at the distal end of the connector line 21, and perform a control operation to maintain the third large switch 30 in an ON state when the third large switch 30 is mounted at the distal end of the connector line 21.

Figure 8:
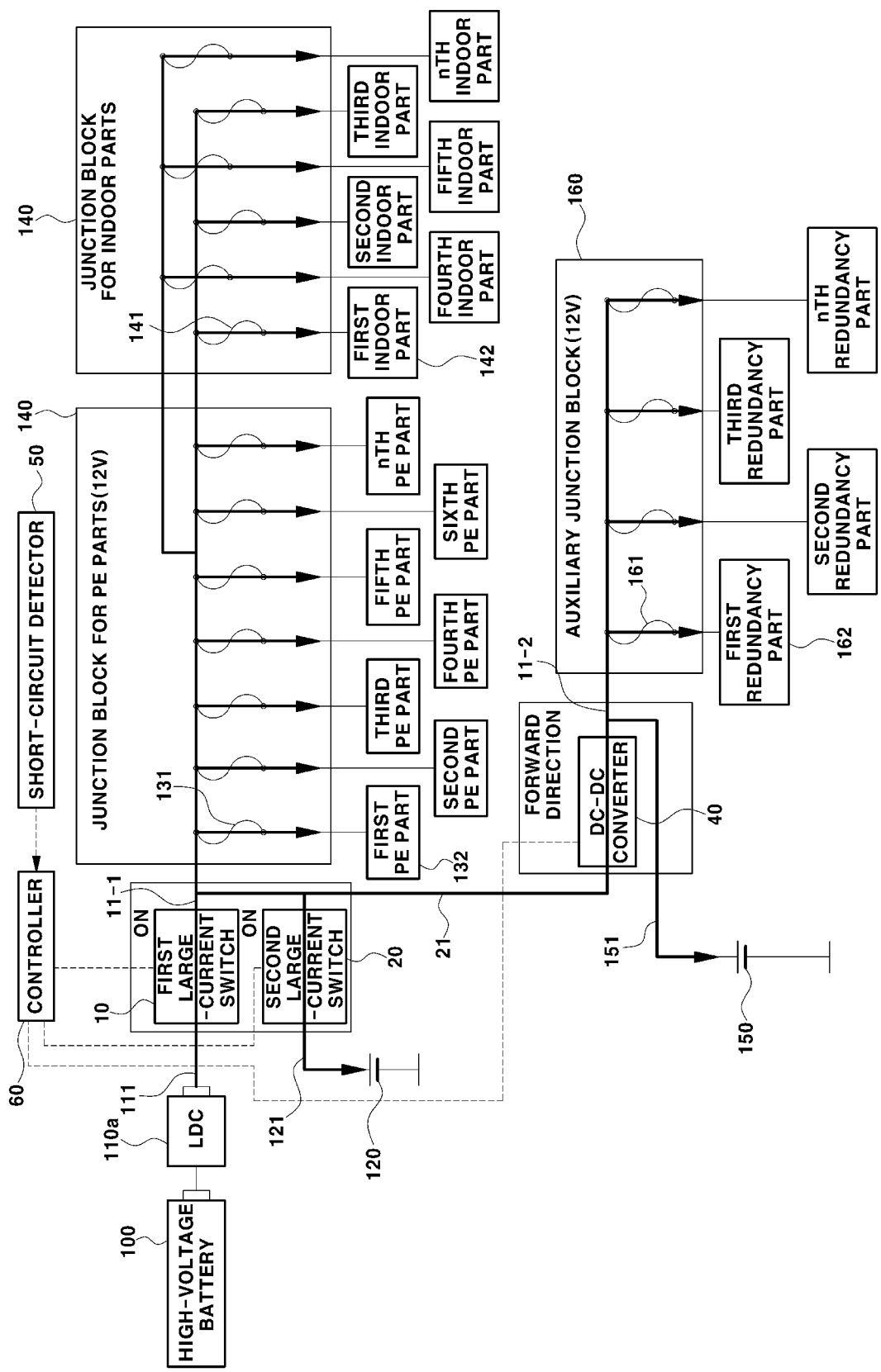
FIGS. 8 to 13 are circuit configuration diagrams illustrating operation examples of the power supply system for the electric vehicle.

If a high DC voltage of the high-voltage battery 100 is converted into a DC voltage (for example, 12 V) in the form of low voltage and large current by the LDC 110, and the converted DC voltage causes a DC current that sequentially passes through the first wiring 111, the first large-current switch 10, and the first conductive line 11-1 and is supplied to the junction block 130 for PE parts and the junction block 140 for indoor parts as illustrated in FIG. 8, a DC voltage may be distributed and supplied to each of the PE parts 132 through the first fuse 131, and a DC voltage may be distributed and supplied to each of the indoor parts 142 through the second fuse 141.

If a high DC voltage of the high-voltage battery 100 is converted into a DC voltage (for example, 12 V) in the form of low voltage and large current by the LDC 110, and the converted DC voltage causes a DC current that sequentially passes through the first wiring 111, the first large-current switch 10, the first conductive line 11-1, and the first charge/discharge line 121 on which the second large-current switch 20 is mounted and is supplied to the first auxiliary battery 120 as illustrated in FIG. 8, the first auxiliary battery 120 may be charged.

A high DC voltage of the high-voltage battery 100 may be converted into a DC voltage (for example, 12 V) in the form of low voltage and large current by the LDC 110, and the converted DC voltage causes a DC current that may sequentially pass through the first wiring 111, the first large-current switch 10, the first conductive line 11-1, the first charge/discharge line 121, the connector line 21, and the DC-DC converter 40 so that a current is allowed to flow in the forward direction, and be supplied to the second auxiliary battery 150 so that the battery may be charged or supplied to the auxiliary junction block 160 as illustrated in FIG. 8.

Figure 9:
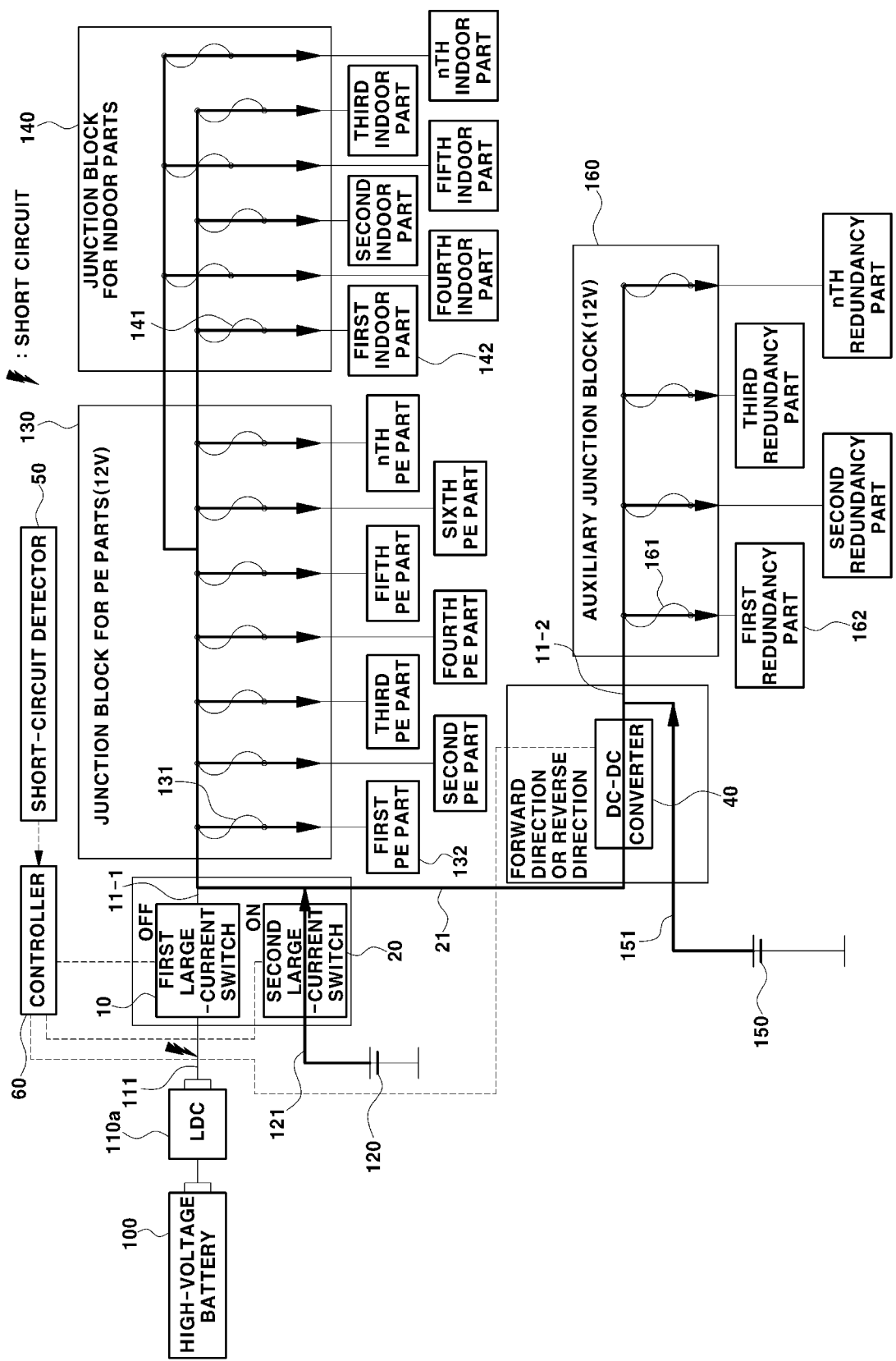

Upon receiving a short-circuit detection signal indicating a short-circuit associated with the first wiring 111 from the short-circuit detector 50, the controller 60 may be configured to perform a control operation to turn off the first large-current switch 10 and to perform a control operation to maintain the second large-current switch 20 in the ON state as illustrated in FIG. 9.

For example, based on a detection signal transmitted from the short-circuit detector 50, when a voltage applied to the first wiring 111 does not satisfy a reference voltage range (e.g., less than a reference voltage range) and/or a current flowing through the first wiring 111 does not satisfy a reference current range (e.g., less than a reference current range), the controller 60 may determine that the first wiring 111 is short-circuited, perform a control operation to turn off the first large-current switch 10, and perform a control operation to maintain the second large-current switch 20 in the ON state as illustrated in FIG. 9.

Accordingly, even when the first wiring 111 is short-circuited, as illustrated in FIG. 9, if the first large-current switch 10 is turned off, and the second large-current switch 20 is maintained in the ON state, power may be supplied to the junction block 130 for PE parts and the junction block 140 for indoor parts from the first auxiliary battery 120 through the first charge/discharge line 121 and the first conductive line 11-1, a DC voltage may be distributed and supplied to each of the PE parts 132 through the first fuse 131, and a DC voltage may be distributed and supplied to each of the indoor parts 142 through the second fuse 141.

Upon receiving a short-circuit detection signal associated with the first wiring 111 from the short-circuit detector 50, the controller 60 may be configured to control the DC-DC converter 40 so that current is allowed to flow in the forward direction or the reverse direction as illustrated in FIG. 9.

For example, upon receiving a short-circuit detection signal associated with the first wiring 111 from the short-circuit detector 50, the controller 60 may be configured to compare an output voltage between the first auxiliary battery 120 and the second auxiliary battery 150, and control the DC-DC converter 40 so that current is allowed to flow in the forward direction when the output voltage of the first auxiliary battery 120 is larger by a reference value or more. On the other hand, when the output voltage is compared between the first auxiliary battery 120 and the second auxiliary battery 150, and the output voltage of the second auxiliary battery 150 is larger by the reference value or more, the controller 60 may be configured to control the DC-DC converter 40 so that current is allowed to flow in the reverse direction.

Accordingly, when the DC-DC converter 40 is controlled so that a current may flow in the forward direction while the second large-current switch 20 is in the ON state, power may be supplied to the second auxiliary battery 150 from the first auxiliary battery 120 along the connector line 21, and thus the second auxiliary battery 150 may be charged.

On the other hand, when the DC-DC converter 40 is controlled so that a current may flow in the reverse direction while the second large-current switch 20 is in the ON state, power may be supplied to the first auxiliary battery 120 from the second auxiliary battery 150 along the connector line 21, and thus the first auxiliary battery 120 may be charged.

Figure 10:
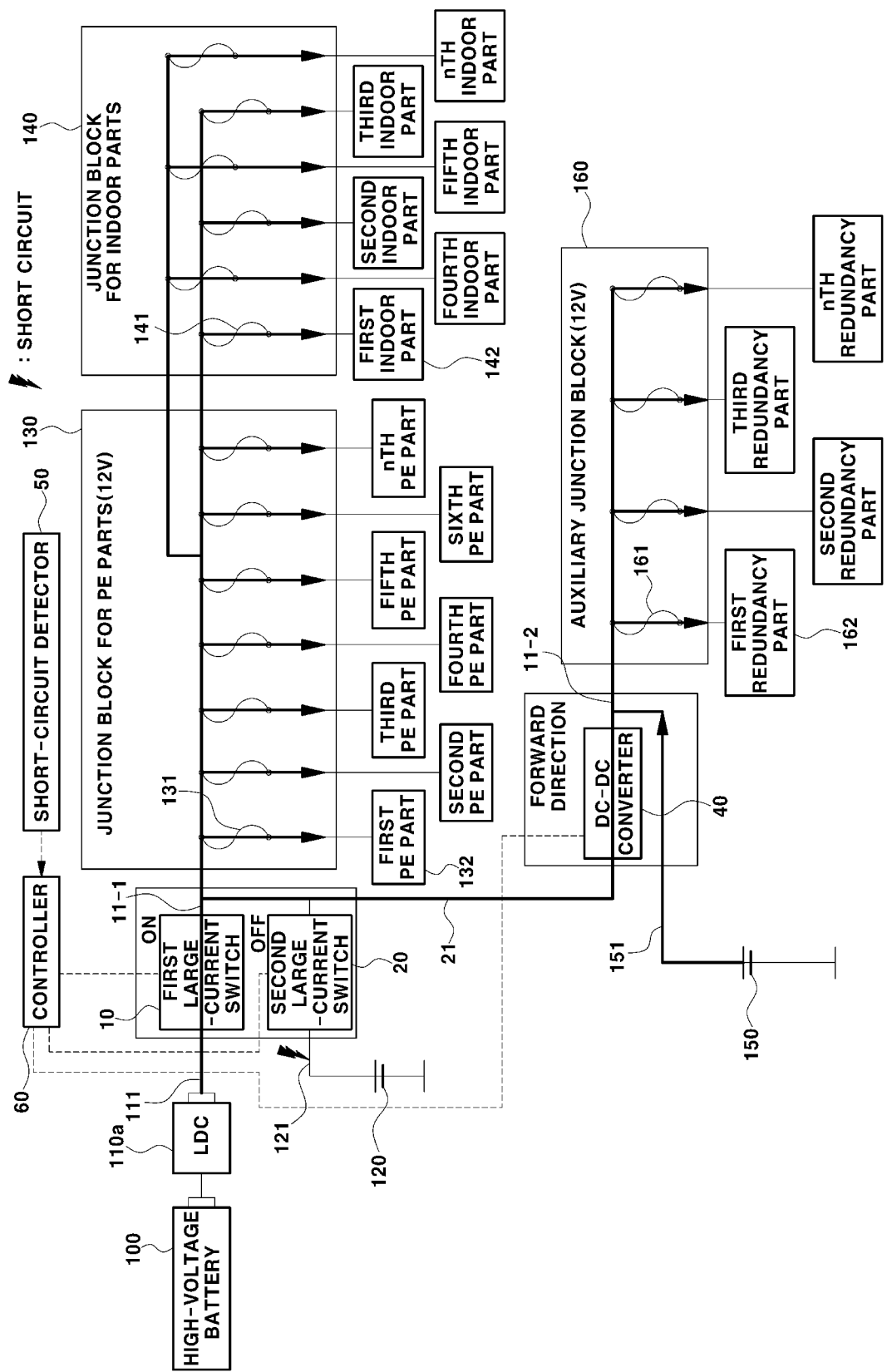

Upon receiving a short-circuit detection signal associated with the first charge/discharge line 121 (connected between the second large-current switch 20 and the first auxiliary battery 120) from the short-circuit detector 50, the controller 60 may be configured to perform a control operation to maintain the first large-current switch 10 in the ON state and perform a control operation to turn off the second large-current switch 20 as illustrated in FIG. 10.

For example, based on a detection signal transmitted from the short-circuit detector 50, when a voltage applied to the charge/discharge line 121 does not satisfy a reference voltage range (e.g., less than a reference voltage range) and/or a current flowing through the first charge/discharge line 121 does not satisfy a reference current range (e.g., less than a reference current range), the controller 60 may determine that the first charge/discharge line 121 is short-circuited, perform a control operation to maintain the first large-current switch 10 in the ON state, and perform a control operation to turn off the second large-current switch 20 as illustrated in FIG. 10.

Accordingly, even when the first charge/discharge line 121 connected to the first auxiliary battery 120 is short-circuited, if the first large-current switch 10 is maintained in the ON state, and the second large-current switch 20 is turned off, power may be supplied to the junction block 130 for PE parts and the junction block 140 for indoor parts from the LDC 110 through the first wiring 111 and the first conductive line 11-1, a DC voltage may be distributed and supplied to each of the PE parts 132 through the first fuse 131, and a DC voltage may be distributed and supplied to each of the indoor parts 142 through the second fuse 141.

Upon receiving a short-circuit detection signal associated with the first charge/discharge line 121 (connected between the second large-current switch 20 and the first auxiliary battery 120) from the short-circuit detector 50, the controller 60 may control the DC-DC converter 40 so that current is allowed to flow in the forward direction as illustrated in FIG. 10. In this way, a DC voltage converted by the LDC 110 may cause a current that sequentially pass through the first wiring 111, the first large-current switch 10, the first conductive line 11-1, the first charge/discharge line 121, the connector line 21, and the DC-DC converter 40 so that current is allowed to flow in the forward direction, be supplied to the second auxiliary battery 150 so that the battery may be charged, and be supplied to the auxiliary junction block 160.

Figure 11:
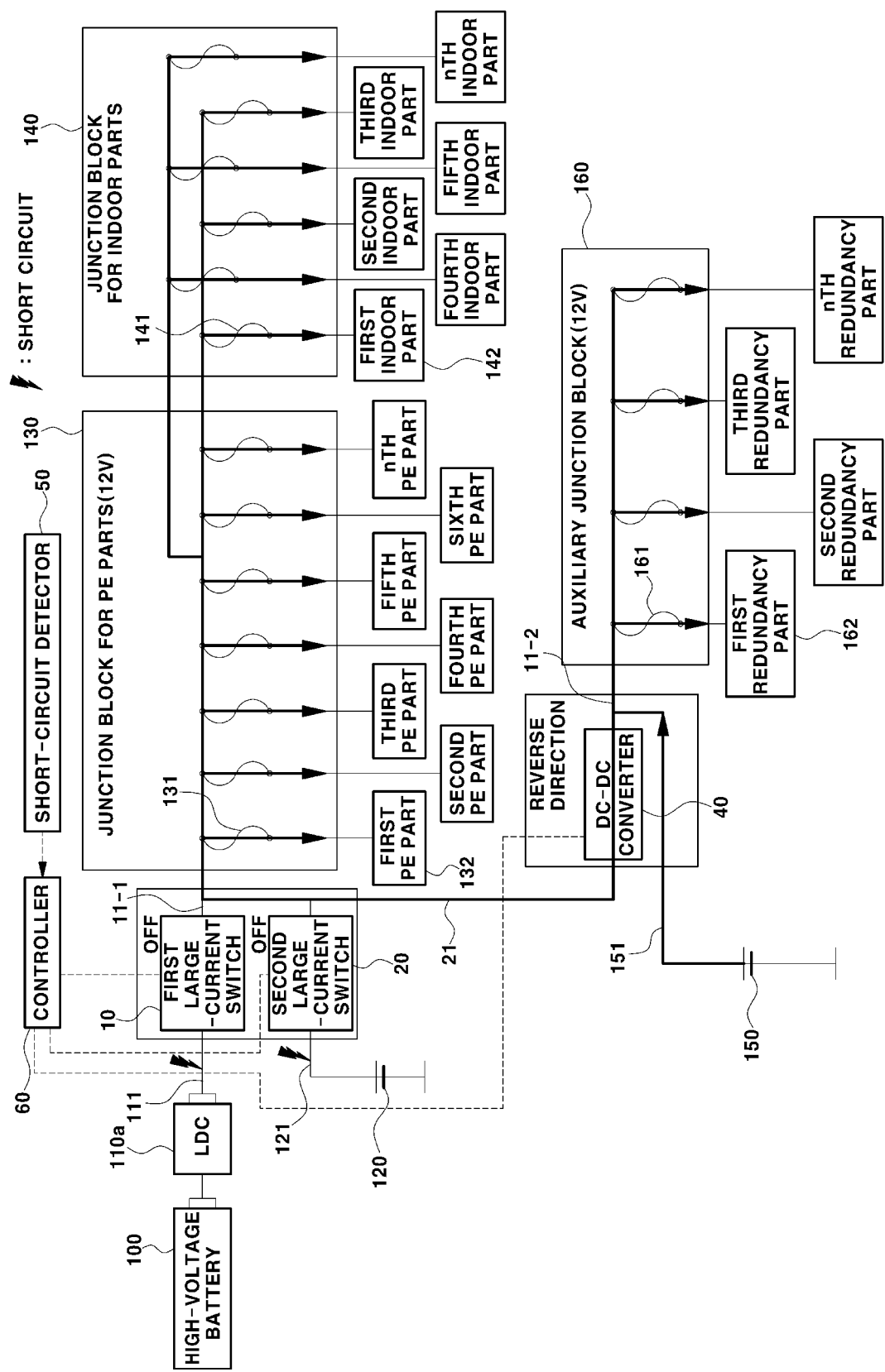

If both the first wiring 111 and the first charge/discharge line 121 are short-circuited (e.g., when a short-circuit detection signal associated with the first wiring 111 and a short-circuit detection signal associated with the first charge/discharge line 121 are received from the short-circuit detector 50), the controller 60 may be configured to control the DC-DC converter 40 so that current is allowed to flow in the reverse direction as illustrated in FIG. 11.

Accordingly, if the DC-DC converter 40 is controlled so that current is allowed to flow in the reverse direction, power may be supplied to the junction block 130 for PE parts and the junction block 140 for indoor parts from the second auxiliary battery 150 through the connector line 21 and the first conductive line 11-1, a DC voltage may be distributed and supplied to each of the PE parts 132 through the first fuse 131, and a DC voltage may be distributed and supplied to each of the indoor parts 142 through the second fuse 141.

When both the first wiring 111 and the first charge/discharge line 121 are short-circuited, if power is supplied to the junction block 130 for PE parts and the junction block 140 for indoor parts from the second auxiliary battery 150, the electric vehicle for autonomous driving may be normally driven. However, in consideration of an SOC limit of the second auxiliary battery 150, the autonomous driving electric vehicle may execute an emergency driving mode so that the vehicle may be moved to a safe place (for example, a repair shop, a rest area, a parking area, etc.).

Upon receiving a short-circuit detection signal associated with the second charge/discharge line 151 from the short-circuit detector 50, in order to supply power to the junction block 130 for PE parts and the junction block 140 for indoor parts, the controller 60 may be configured to perform a control operation to maintain the first large-current switch 10 and the second large-current switch 20 in the ON state, and control the DC-DC converter 40 (or control the third large-current switch 30) so that a current flow may be blocked or perform a control operation to disable the DC-DC converter 40 (or turn off the third large-current switch 30).

Figure 12:
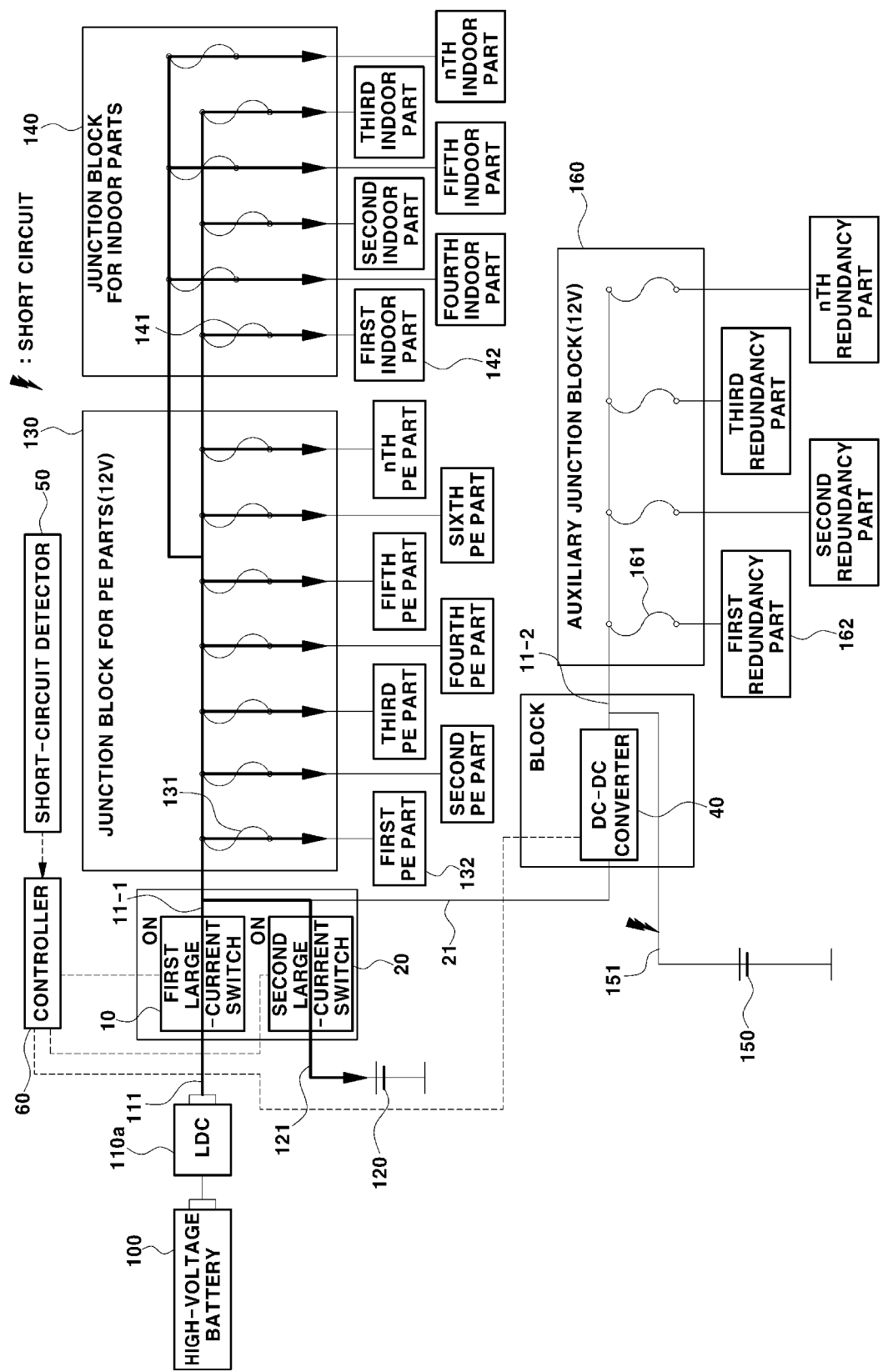

For example, based on a detection signal transmitted from the short-circuit detector 50, if a voltage applied to the second charge/discharge line 151 does not satisfy a reference voltage range (e.g., less than a reference voltage range) and/or a current flowing through the second charge/discharge line 151 does not satisfy a reference current range (e.g., less than a reference current range), the controller 60 may determine that the second charge/discharge line 151 is short-circuited, perform a control operation to maintain the first large-current switch 10 and/or the second large-current switch 20 in the ON state, and control the DC-DC converter 40 (or the third large-current switch 30) so that a current flow may be blocked as illustrated in FIG. 12.

Accordingly, power may be supplied to the junction block 130 for PE parts and the junction block 140 for indoor parts from the LDC 110 through the first wiring 111 and the first conductive line 11-1, and the first auxiliary battery 120 may be charged with power from the LDC 110 through the first wiring 111, the first conductive line 11-1, and the first charge/discharge line 121.

As the second charge/discharge line 151 is short-circuited, redundant power, which may be a type of backup power, may not be supplied to the auxiliary junction block 160 from the second auxiliary battery 150, and thus the controller 60 may control an alarm to be output through a cluster to induce vehicle maintenance.

Figure 13:
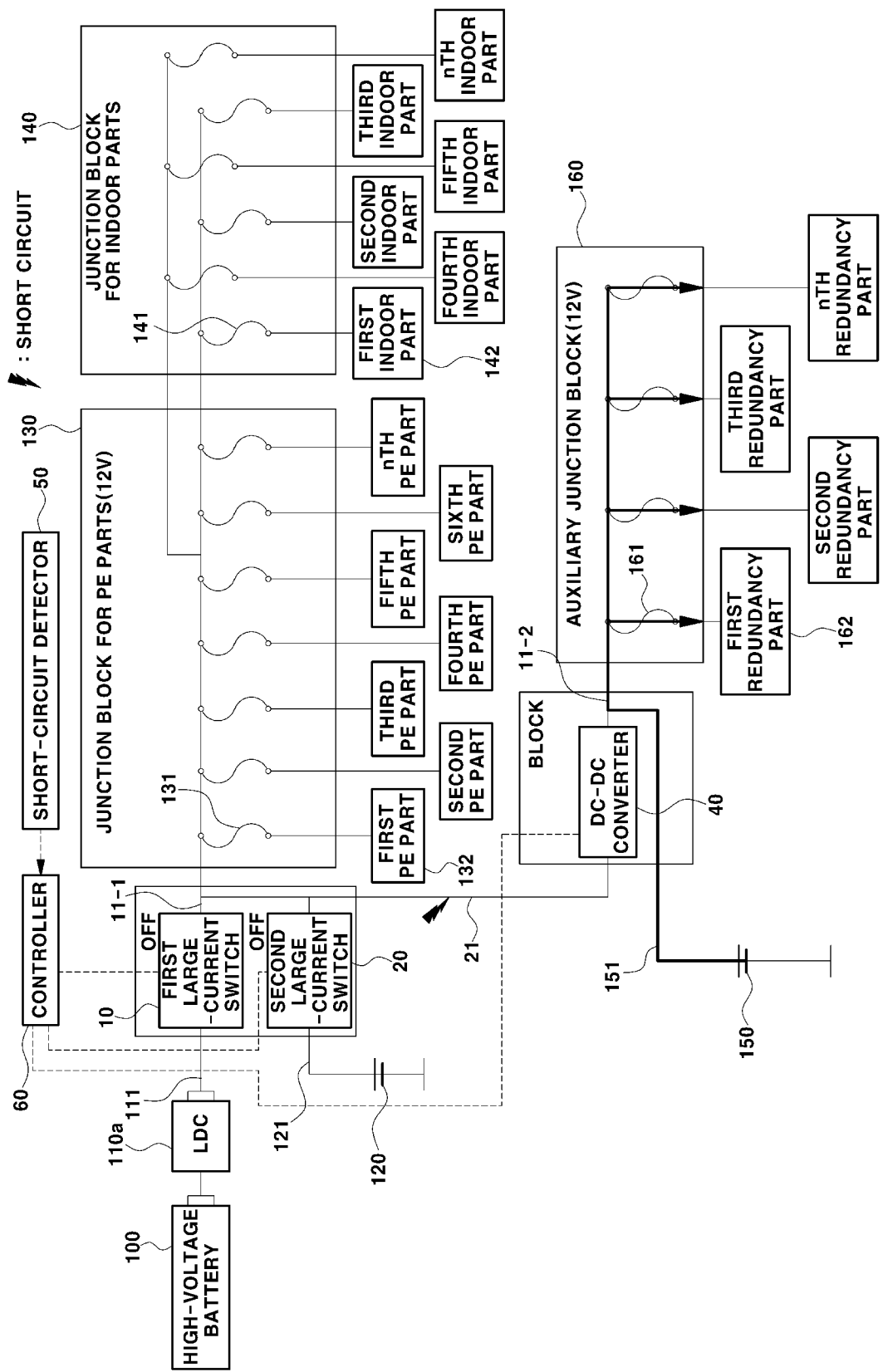

Upon receiving a short-circuit detection signal associated with the connector line 21 from the short-circuit detector 50, as illustrated in FIG. 13, the controller 60 may be configured to perform a control operation to turn off the first large-current switch 10 and the second large-current switch 20, and to control the DC-DC converter 40 (or the third large-current switch 30) so that a current flow may be blocked or to perform a control operation to disable the DC-DC converter 40 (or turn off the third large-current switch 30).

For example, when the connector line 21 is short-circuited, a current output from the LDC 110 and a discharge current of the first auxiliary battery 120 may not flow to the junction block 130 for PE parts and the junction block 140 for indoor parts and may leak via a short-circuit part of the connector line 21. Therefore, in order to prevent such current leakage, as illustrated in FIG. 13, the controller 60 may be configured to perform a control operation to turn off the first large-current switch 10 and the second large-current switch 20, and control the DC-DC converter 40 (or the third large-current switch 30) so that a current flow may be blocked or perform a control operation to disable the DC-DC converter 40 (or turn off the third large-current switch 30).

Accordingly, when a control operation is performed so that the first large-current switch 10 and the second large-current switch 20 are turned off, and the DC-DC converter 40 is controlled so that a current flow may be blocked, redundant power, which may be a type of backup power, may be supplied to the auxiliary junction block 160 from the second auxiliary battery 150 through the second conductive line 11-2. When this redundant power is distributed and supplied to each of the redundancy parts 162 through the second fuse 161, inertia driving for emergency evacuation of the vehicle to a safe place (for example, a shoulder) may be performed by an operation of each redundancy part 162.

As described above, when an architecture circuit for power supply to PE parts and indoor parts is variously configured using a plurality of large-current switches, a DC-DC converter, etc. in order to respond to various short circuits occurring in a power supply circuit of the electric vehicle for autonomous driving, it may be possible to provide various types of power supply systems for stabilizing power supply in response to short circuit of wiring connected to an output terminal of an LDC.

As described above, according to one or more aspects of the disclosure, a power supply system for an electric vehicle may include a first low-voltage DC-DC converter (LDC) and a second LDC connected in parallel to a high-voltage battery, a first large-current switch mounted at a rear end of first wiring connected to an output terminal of the first LDC, a junction block for power electric (PE) parts and a junction block for indoor parts connected in series with the first large-current switch by a conductive line, a first auxiliary battery connected to a first charge/discharge line branched from the conductive line, a second large-current switch mounted on the first charge/discharge line, an auxiliary junction block connected to an output terminal of the second LDC by second wiring, a second auxiliary battery connected to a second charge/discharge line branched from the second wiring, a short-circuit detector configured to detect short circuit of the first wiring and the first charge/discharge line, and a controller configured to perform a control operation to selectively turn off the first large-current switch or the second large-current switch or perform a control operation to turn off both the first large-current switch and the second large-current switch according to a detection signal of the short-circuit detector.

If a short-circuit detection signal of the first wiring is received from the short-circuit detector, the controller may be configured to perform a control operation to turn off the first large-current switch and perform a control operation to maintain the second large-current switch in an on state.

If the first large-current switch is turned off, and the second large-current switch is maintained in the on state, power may be supplied to the junction block for PE parts and the junction block for indoor parts from the first auxiliary battery through the first charge/discharge line and the conductive line.

If a short-circuit detection signal of the first charge/discharge line connected between the second large-current switch and the first auxiliary battery is received from the short-circuit detector, the controller may be configured to perform a control operation to maintain the first large-current switch in an on state and to perform a control operation to turn off the second large-current switch.

If the first large-current switch is maintained in the on state, and the second large-current switch is turned off, power may be supplied to the junction block for PE parts and the junction block for indoor parts from the first LDC through the first wiring and the conductive line.

As described above, according to one or more aspects of the disclosure, a power supply system for an electric vehicle may include an LDC connected to a high-voltage battery, a first large-current switch mounted at a rear end of first wiring connected to an output terminal of the first LDC, a junction block for PE parts and a junction block for indoor parts connected in series with the first large-current switch by a conductive line, a first auxiliary battery connected to a first charge/discharge line branched from the conductive line, a second large-current switch mounted on the first charge/discharge line, a connector line branched from the first charge/discharge line between the first conductive line and the second large-current switch, a DC-DC converter or a third large-current switch mounted at a distal end of the connector line, an auxiliary junction block connected to the DC-DC converter or the third large-current switch by a second conductive line, a second auxiliary battery connected to a second charge/discharge line branched from the second conductive line, a short-circuit detector configured to detect short circuit of the first wiring, the first charge/discharge line, the connector line, and the second charge/discharge line, and a controller configured to perform a control operation to selectively turn off the first large-current switch, the second large-current switch, the DC-DC converter, or the third large-current switch according to a detection signal of the short-circuit detector.

Lead-acid batteries may be adopted as the first auxiliary battery and the second auxiliary battery when the DC-DC converter is mounted at the distal end of the connector line, and lithium-ion batteries may be adopted as the first auxiliary battery and the second auxiliary battery when the third large-current switch is mounted at the distal end of the connector line.

If a short-circuit detection signal of the first wiring is received from the short-circuit detector, the controller may be configured to perform a control operation to turn off the first large-current switch and perform a control operation to maintain the second large-current switch in an on state.

If the first large-current switch is turned off, and the second large-current switch is maintained in the on state, power may be supplied to the junction block for PE parts and the junction block for indoor parts from the first auxiliary battery through the first charge/discharge line and the first conductive line.

If a short-circuit detection signal of the first wiring is received from the short-circuit detector, the controller may be configured to compare an output voltage between the first auxiliary battery and the second auxiliary battery, and to control the DC-DC converter so that current is allowed to flow in a forward direction when the output voltage of the first auxiliary battery is larger by a reference value.

If the DC-DC converter is controlled so that current is allowed to flow in the forward direction, power may be allowed to be supplied from the first auxiliary battery to the second auxiliary battery, and the second auxiliary battery may be charged.

If a short-circuit detection signal of the first wiring is received from the short-circuit detector, the controller may be configured to compare an output voltage between the first auxiliary battery and the second auxiliary battery, and to control the DC-DC converter so that current is allowed to flow in a reverse direction when the output voltage of the second auxiliary battery is larger by a reference value.

If the DC-DC converter is controlled so that current is allowed to flow in the reverse direction, power may be allowed to be supplied from the second auxiliary battery to the first auxiliary battery, and the first auxiliary battery may be charged.

If a short-circuit detection signal of the first charge/discharge line connected between the second large-current switch and the first auxiliary battery is received from the short-circuit detector, the controller may be configured to perform a control operation to maintain the first large-current switch in an on state and to perform a control operation to turn off the second large-current switch.

If the first large-current switch is maintained in the on state, and the second large-current switch is turned off, power may be supplied to the junction block for PE parts and the junction block for indoor parts from the LDC through the first wiring and the first conductive line.

If a short-circuit detection signal of the first wiring and a short-circuit detection signal of the first charge/discharge line connected between the second large-current switch and the first auxiliary battery are received from the short-circuit detector, the controller may be configured to control the DC-DC converter so that current is allowed to flow in a reverse direction.

If the DC-DC converter is controlled so that current is allowed to flow in the reverse direction, power may be supplied to the junction block for PE parts and the junction block for indoor parts from the second auxiliary battery through the connector line and the first conductive line.

If a short-circuit detection signal of the second charge/discharge line is received from the short-circuit detector, the controller may be configured to maintain the first large-current switch and the second large-current switch in an on state, and control the DC-DC converter so that a current flow is allowed to be blocked or perform a control operation to turn off the third large-current switch to supply power to the junction block for PE parts and the junction block for indoor parts.

If a short-circuit detection signal of the connector line is received from the short-circuit detector, the controller may be configured to perform a control operation to turn off the first large-current switch and the second large-current switch, and control the DC-DC converter so that a current flow is allowed to be blocked or perform a control operation to turn off the third large-current switch.

If a control operation is performed to turn off the first large-current switch and the second large-current switch, and the DC-DC converter is controlled so that a current flow is allowed to be blocked or a control operation is performed to turn off the third large-current switch, power may be supplied from the second auxiliary battery to the auxiliary junction block through the second conductive line.

Through the one or more features described above for solving the above problems, one or more configurations of the present disclosure provide the following effects.

First, it may be possible to stabilize power supply to a junction block for PE parts and a junction block for indoor parts in response to short circuit of wiring connected to an output terminal of an LDC, and it may be possible to further stabilize power supply through optimal charge/discharge control between first and second auxiliary batteries according to a state of charge (SOC) of each of the first and second auxiliary batteries.

Second, it may be possible to prevent a blackout phenomenon in which various controllers, which are PE parts connected to a junction block for PE parts, are reset in response to short circuit of wiring through which a DC voltage in the form of low voltage and large current flows. As a result, the vehicle may be driven for several minutes, and thus may be moved to a safe place.

Third, by variously configuring an architecture circuit for power supply to PE parts and indoor parts using a plurality of large-current switches, a DC-DC converter, etc., it may be possible to provide various types of power supply systems for stabilizing power supply in response to short circuit of wiring connected to an output terminal of an LDC.

Fourth, by variously configuring an architecture circuit for power supply to PE parts and indoor parts using a plurality of large-current switches, a DC-DC converter, etc., it may be possible to implement a higher-level redundancy function for stabilizing power supply in response to short circuit of wiring connected to an output terminal of an LDC.

Fifth, it may be possible to realize cost reduction by connecting a plurality of large-current switches, a DC-DC converter, etc. to one expensive LDC to configure an architecture circuit for power supply, and changing a lithium-ion battery for an auxiliary battery to a low-cost lead-acid battery.

Even though various examples have been described in detail above, the scope of the present disclosure is not limited to the examples described above, and various modifications and improvements by those skilled in the art using the basic concept of the present disclosure as defined in the claims below are within in the scope of the present invention.

What is claimed is:

1. A power supply system for an electric vehicle, the power supply system comprising:

a first low-voltage DC-DC converter (LDC) and a second LDC connected in parallel to a main battery;
a first switch coupled to an output terminal of the first LDC via first wiring;
a junction block for power electric (PE) parts and a junction block for indoor parts connected in series, wherein the junction block for PE parts is coupled to the first switch via a conductive line;
a first auxiliary battery coupled to a first charge/discharge line branched from the conductive line;
a second switch coupled to the first charge/discharge line;
an auxiliary junction block coupled to an output terminal of the second LDC via second wiring;
a second auxiliary battery coupled to a second charge/discharge line branched from the second wiring;
a short-circuit detector configured to detect at least one of: a short circuit associated with the first wiring or a short circuit associated with the first charge/discharge line; and
a controller, based on a detection signal of the short-circuit detector, configured to perform a control operation to selectively turn off the first switch or the second switch or perform a control operation to turn off both the first switch and the second switch.

2. The power supply system of claim 1, wherein, based on a short-circuit detection signal associated with the first wiring being received from the short-circuit detector, the controller is configured to perform a control operation to turn off the first switch and perform a control operation to maintain the second switch in an ON state.

3. The power supply system of claim 2, wherein, based on the first switch being turned off, and the second switch being maintained in the ON state, power is supplied to the junction block for PE parts and the junction block for indoor parts from the first auxiliary battery via the first charge/discharge line and the conductive line.

4. The power supply system of claim 1, wherein, based on a short-circuit detection signal associated with the first charge/discharge line being received from the short-circuit detector, the controller is configured to perform a control operation to maintain the first switch in an ON state and to perform a control operation to turn off the second switch.

5. The power supply system of claim 4, wherein, based on the first switch is maintained in the ON state, and the second switch is turned off, power is supplied to the junction block for PE parts and the junction block for indoor parts from the first LDC through the first wiring and the conductive line.

6. A power supply system for an electric vehicle, the power supply system comprising:
a low-voltage DC-DC converter (LDC) coupled to a main battery;
a first switch coupled to an output terminal of the LDC via first wiring;
a junction block for power electric (PE) parts and a junction block for indoor parts connected in series, wherein the junction block for PE parts is coupled to the first switch via a first conductive line;
a first auxiliary battery coupled to a first charge/discharge line branched from the first conductive line;
a second switch coupled to the first charge/discharge line;
a connector line branched from the first charge/discharge line between the first conductive line and the second switch;
an auxiliary node coupled to the connector line;
an auxiliary junction block coupled to the auxiliary node via a second conductive line;
a second auxiliary battery coupled to a second charge/discharge line branched from the second conductive line;
a short-circuit detector configured to detect at least one of:
a short circuit associated with the first wiring, a short circuit associated with the first charge/discharge line, a short circuit associated with the connector line, or a short circuit associated with the second charge/discharge line; and
a controller, based on a detection signal of the short-circuit detector, configured to perform a control operation to selectively turn off the first switch, the second switch, or the auxiliary node.

7. The power supply system of claim 6, wherein lead-acid batteries are adopted as the first auxiliary battery and the second auxiliary battery when the auxiliary node comprises a DC-DC converter, or wherein lithium-ion batteries are adopted as the first auxiliary battery and the second auxiliary battery when the auxiliary node comprises a third switch.

8. The power supply system of claim 6, wherein, based on a short-circuit detection signal associated with the first wiring being received from the short-circuit detector, the controller is configured to perform a control operation to turn off the first switch and perform a control operation to maintain the second switch in an ON state.

9. The power supply system of claim 8, wherein, based on the first switch being turned off, and the second switch being maintained in the ON state, power is supplied to the junction block for PE parts and the junction block for indoor parts from the first auxiliary battery via the first charge/discharge line and the first conductive line.

10. The power supply system of claim 6, wherein, based on a short-circuit detection signal associated with the first wiring being received from the short-circuit detector, the controller is configured to compare an output voltage of the first auxiliary battery and an output voltage of the second auxiliary battery, and to control the auxiliary node so that current is allowed to flow from the first auxiliary battery to the second auxiliary battery when the output voltage of the first auxiliary battery is larger than the output voltage of the second auxiliary battery by a reference value.

11. The power supply system of claim 10, wherein, when the current is allowed to flow from the first auxiliary battery to the second auxiliary battery, power is allowed to be supplied from the first auxiliary battery to the second auxiliary battery, and the second auxiliary battery is charged.

12. The power supply system of claim 6, wherein, based on a short-circuit detection signal associated with the first wiring being received from the short-circuit detector, the controller is configured to compare an output voltage of the first auxiliary battery and an output voltage of the second auxiliary battery, and to control the auxiliary node so that current is allowed to flow from the second auxiliary battery to the first auxiliary battery when the output voltage of the second auxiliary battery is larger than the output voltage of the first auxiliary battery by a reference value.

13. The power supply system of claim 12, wherein, when the current is allowed to flow from the second auxiliary battery to the first auxiliary battery, power is allowed to be supplied from the second auxiliary battery to the first auxiliary battery, and the first auxiliary battery is charged.

14. The power supply system of claim 6, wherein, based on a short-circuit detection signal associated with the first charge/discharge line being received from the short-circuit detector, the controller is configured to perform a control operation to maintain the first switch in an ON state and to perform a control operation to turn off the second switch.

15. The power supply system of claim 14, wherein, based on the first switch being maintained in the ON state, and the second switch being turned off, power is supplied to the junction block for PE parts and the junction block for indoor parts from the LDC via the first wiring and the first conductive line.

16. The power supply system of claim 6, wherein, based on a short-circuit detection signal associated with the first wiring and a short-circuit detection signal associated with the first charge/discharge line being received from the short-circuit detector, the controller is configured to control the auxiliary node so that a current is allowed to flow from the second auxiliary battery to the first auxiliary battery.

17. The power supply system of claim 16, wherein, when the current is allowed to flow from the second auxiliary battery to the first auxiliary battery, power is supplied to the junction block for PE parts and the junction block for indoor parts from the second auxiliary battery via the connector line and the first conductive line.

18. The power supply system of claim 6, wherein, based on a short-circuit detection signal associated with the second charge/discharge line being received from the short-circuit detector, the controller is configured to maintain the first switch and the second switch in ON states, and control a DC-DC converter so that a current flow is allowed to be blocked or perform a control operation to turn off a third switch to supply power to the junction block for PE parts and the junction block for indoor parts, and wherein the auxiliary node comprises at least one of: the DC-DC converter or the third switch.

19. The power supply system of claim 6, wherein, based on a short-circuit detection signal associated with the connector line being received from the short-circuit detector, the controller is configured to perform a control operation to turn off the first switch and the second switch, and control a DC-DC converter of the auxiliary node so that a current flow is allowed to be blocked or perform a control operation to turn off a third switch of the auxiliary node.

20. The power supply system of claim 19, wherein power is supplied from the second auxiliary battery to the auxiliary junction block via the second conductive line based on:
 a control operation being performed to turn off the first switch and the second switch; and
 a DC-DC converter of the auxiliary node being controlled so that a current flow is allowed to be blocked or a control operation being performed to turn off a third switch of the auxiliary node.

* * * * *